US007150002B1

(12) United States Patent
Anderson et al.

(10) Patent No.: US 7,150,002 B1
(45) Date of Patent: Dec. 12, 2006

(54) GRAPHICAL USER INTERFACE WITH LOGIC UNIFYING FUNCTIONS

(75) Inventors: Douglas Anderson, Edmonds, WA (US); Steven Roe, Woodinville, CA (US); Craig Nemecek, Seattle, WA (US)

(73) Assignee: Cypress Semiconductor Corp., San Jose, CA (US)

( * ) Notice: Subject to any disclaimer, the term of this patent is extended or adjusted under 35 U.S.C. 154(b) by 582 days.

(21) Appl. No.: 10/109,979

(22) Filed: Mar. 29, 2002

(51) Int. Cl.
*G06F 9/44* (2006.01)
(52) U.S. Cl. .................. 717/107; 717/113; 717/125
(58) Field of Classification Search ........ 717/106–113, 717/124–125; 715/700
See application file for complete search history.

(56) References Cited

U.S. PATENT DOCUMENTS 6,601,236 B1 *  7/2003  Curtis ..................... 717/177
6,611,276 B1 *  8/2003  Muratori et al. ........... 715/772
6,664,978 B1 * 12/2003  Kekic et al. .............. 715/733
6,718,533 B1 *  4/2004  Schneider et al. .......... 717/100
6,823,497 B1 * 11/2004  Schubert et al. ............ 716/4
6,865,429 B1 *  3/2005  Schneider et al. .......... 700/86

* cited by examiner

*Primary Examiner*—Ted T. Vo

(57) ABSTRACT

Programming a plurality of states having respective threads is achieved by an event engine and a computer controlled GUI causing the event engine to monitor a signal and execute an action based thereon. The GUI programs an event and several states and causes the event engine to traverse between the states upon reaching the event. The GUI further programs a logic chain which unifies the threads. A method unifies several threads by selecting and executing a logic operation. The method further configures several states and causes traversing between them. The GUI may be deployed co-functionally with debuggers, logic analyzers, scopes, utilities, and software development tools. The results of the GUI are automatically transformed into program code which programs the event engine to operate during debug of a device under test by monitoring for events and taking action based thereon.

31 Claims, 38 Drawing Sheets

600

| BITS(S) | DATA WORD | DESCRIPTION |
|---|---|---|
| 31 | 0 | EVENT THREAD ENABLE |
| 30:25 | 0 | POINTER TO NEXT EVENT CELL |
| 24 | 0 | INVERT DECISION LOGIC OUTPUT |
| 23 | 0 | EXTERNAL TRIGGER |
| 22 | 0 | TRACE OFF |
| 21 | 0 | TRACE ON |
| 20 | 0 | BREAK |
| 19:16 | 0 | INPUT BUS SELECT<br>0 - PROGRAM COUNTER (PC)<br>1 - MICRO IO ADDRESS BUS (DA)<br>2 - MICRO MEM ADDRESS BUS (DA)<br>3 - MICRO IO DATA BUS (DB)<br>4 - MICRO MEM DATA BUS (DB)<br>5 - MICRO INSTRUCTION REGISTER (IR)<br>6 - EXTERNAL LOGIC PINS<br>7 - MICRO EXTRA REGISTER (X)<br>8 - MICRO ACCUMULATOR (A)<br>9 - STACK POINTER (SP)<br>a - IO DA AND IO DB<br>b - MEM DA AND MEM DB<br>c - EXTRA REGISTER AND ACCUMULATOR (X HIGH)<br>d - IR AND SP (IR HIGH) |
| 15:0 | 0 | COUNTER START VALUE |
| 31:16 | 1 | MAXIMUM VALUE FOR WORD COMPARE |
| 15:0 | 1 | MINIMUM VALUE FOR WORD COMPARE |

| BITS(S) | DATA WORD | DESCRIPTION |
|---|---|---|
| 31 | 0 | EVENT THREAD ENABLE |
| 30:25 | 0 | POINTER TO NEXT EVENT CELL |
| 24 | 0 | INVERT DECISION LOGIC OUTPUT |
| 23 | 0 | EXTERNAL TRIGGER |
| 22 | 0 | TRACE OFF |
| 21 | 0 | TRACE ON |
| 20 | 0 | BREAK |
| 19:16 | 0 | INPUT BUS SELECT<br>0 - BIT FIELD:<br>    7 - EXTENDED IO FLAG<br>    6 - CARRY FLAG<br>    5 - ZERO FLAG<br>    4 - GLOBAL INTERRUPT FLAG<br>    3 - IO WRITE FLAG<br>    2 - IO READ FLAG<br>    1 - MEMORY WRITE FLAG<br>    0 - MEMORY READ FLAG<br>1 - MICRO IO ADDRESS BUS (DA)<br>2 - MICRO MEM ADDRESS BUS (DA)<br>3 - MICRO IO DATA BUS (DB)<br>4 - MICRO MEM DATA BUS (DB)<br>5 - MICRO INSTRUCTION REGISTER (IR)<br>6 - EXTERNAL LOGIC PINS<br>7 - MICRO EXTRA REGISTER (X)<br>8 - MICRO ACCUMULATOR (A)<br>9 - STACK POINTER (SP) |
| 15:0 | 0 | COUNTER START VALUE |
| 31:24 | 1 | RESERVED |
| 23:16 | 1 | MAXIMUM VALUE FOR RANGE COMPARE |
| 15:8 | 1 | BIT MASK |
| 7:0 | 1 | MINIMUM VALUE FOR RANGE COMPARE |

| BITS(S) | DATA WORD | DESCRIPTION |
|---|---|---|
| 31 | 0 | RESERVED |
| 30:24 | 0 | POINTER TO NEXT STATE FOR THIS CHAIN |
| 23:18 | 0 | RESERVED |
| 17 | 0 | ENABLE BIT |
| 16 | 0 | OUTPUT INVERT |
| 15 | 0 | EVENT THREAD 7 POSITIVE LOGIC ENABLE |
| 14 | 0 | EVENT THREAD 7 NEGATIVE LOGIC ENABLE |
| 13 | 0 | EVENT THREAD 6 POSITIVE LOGIC ENABLE |
| 12 | 0 | EVENT THREAD 6 NEGATIVE LOGIC ENABLE |
| 11 | 0 | EVENT THREAD 5 POSITIVE LOGIC ENABLE |
| 10 | 0 | EVENT THREAD 5 NEGATIVE LOGIC ENABLE |
| 9 | 0 | EVENT THREAD 4 POSITIVE LOGIC ENABLE |
| 8 | 0 | EVENT THREAD 4 NEGATIVE LOGIC ENABLE |
| 7 | 0 | EVENT THREAD 3 POSITIVE LOGIC ENABLE |
| 6 | 0 | EVENT THREAD 3 NEGATIVE LOGIC ENABLE |
| 5 | 0 | EVENT THREAD 2 POSITIVE LOGIC ENABLE |
| 4 | 0 | EVENT THREAD 2 NEGATIVE LOGIC ENABLE |
| 3 | 0 | EVENT THREAD 1 POSITIVE LOGIC ENABLE |
| 2 | 0 | EVENT THREAD 1 NEGATIVE LOGIC ENABLE |
| 1 | 0 | EVENT THREAD 0 POSITIVE LOGIC ENABLE |
| 0 | 0 | EVENT THREAD 0 NEGATIVE LOGIC ENABLE |

| FIELD | OR | AND | NOR | NAND |
|---|---|---|---|---|
| CHAIN ENABLE | 1 | 1 | 1 | 1 |
| INVERT OUTPUT | 1 | 0 | 0 | 1 |
| POSITIVE LOGIC ENABLE | 1 | 0 | 1 | 0 |
| NEGATIVE LOGIC ENABLE | 0 | 1 | 0 | 1 |

| FIELD | OR | AND | NOR | NAND |
|---|---|---|---|---|
| CHAIN ENABLE | 1 | 1 | 1 | 1 |
| INVERT OUTPUT | 1 | 0 | 0 | 1 |
| POSITIVE LOGIC ENABLE EVENT A | 0 | 0 | 1 | 0 |
| NEGATIVE LOGIC ENABLE EVENT A | 1 | 1 | 0 | 1 |
| POSITIVE LOGIC ENABLE EVENT B | 1 | 1 | 0 | 1 |
| NEGATIVE LOGIC ENABLE EVENT B | 0 | 0 | 1 | 0 |
| POSITIVE LOGIC ENABLE EVENT C | 1 | 0 | 1 | 1 |
| NEGATIVE LOGIC ENABLE EVENT C | 0 | 1 | 0 | 0 |

|  | $E_1$ 120a | $E_2$ 120b | $E_3$ 120c | $E_4$ 120d |
|---|---|---|---|---|
| $C_1$ 1110a | BE | BE | BE | 1 |
| $C_2$ 1110b | 1 | 1 | 1 | 1 |

CHAIN OUTPUT SIGNAL 1125

1860

|  | $E_1$ | $E_2$ | $E_3$ | $E_4$ |
|---|---|---|---|---|
| $C_1$ | BE | BE | 1 | 1 |
| $C_2$ | 1 | 1 | BE | BE |

1870

|  | $E_1$ | $E_2$ | $E_3$ | $E_4$ |
|---|---|---|---|---|
| $C_1$ | 1 | 1 | 1 | 1 |
| $C_2$ | 1 | 1 | 1 | 1 |

FIGURE 18B

GRAPHICAL USER INTERFACE WITH LOGIC UNIFYING FUNCTIONS

FIELD OF THE INVENTION

The present invention relates to the field of testing electronic devices. Specifically, embodiments of the present invention relates to a graphical user interface with logic unifying functions.

BACKGROUND ART

Logic analyzers and in-circuit emulators have been used for many years by software and hardware developers to help diagnose and debug hardware and software. Such devices may be able to monitor and analyze various circuit and software conditions during debugging and testing of the design. For example, they may store trace information, such as time stamps, register values, data memory content, etc., which may be later analyzed. They may also provide various configurable breakpoints, which allow the designer to analyze the state of the design at a point in its operation by stopping operation when a specified condition occurs. The breakpoints may be based on a series of conditions that must happen before the operation is stopped.

For example, conventional logic analyzers and in-circuit-emulators may have a relatively small number of custom designed complex breakpoints. A designer may cause the analyzing device to perform a specified action upon a condition's occurrence. For example, a first breakpoint might look for a write to a certain memory address. When the first breakpoint triggers, it activates a second complex breakpoint, which may look for a certain program counter value. When the program counter reaches that value, a third complex breakpoint is activated, which may watch for a certain stack pointer value. When the stack pointer reaches the specified value a fourth complex breakpoint is activated, which may watch for a certain accumulator value. Finally, when the accumulator value is reached the operation breaks.

Unfortunately, conventional analyzing devices offer only a few breakpoints, which are implemented as dedicated pieces of hardware, each designed to look for one condition. Because much of the hardware is dedicated to one function, it is prohibitively expensive to provide a substantial number of breakpoints. Consequently, only a limited number of events can be programmed and only a limited number of conditions can be monitored. Also, separate conventional systems are required to perform both logic analyzer and in-circuit-emulation functions. For example, conventional logic analyzers are able to monitor signals that an in-circuit-emulator would not normally analyze, such as signals that originate outside the circuit containing the emulator. Likewise a logic analyzer would not normally provide emulation functionality. Consequently, substantial added expensive must be taken to purchase and maintain both systems.

Furthermore conventionally, dedicated event hardware is designed to examine certain hardware resources. In order to perform a complex sequence of checks and then take an action based thereon in the conventional art, custom logic is needed to determine when the conditions checked for arose, and then to take appropriate action. The complexity of the logic required is determined conventionally by the complexity of the expressions needed. If complex expressions are required, then conventionally, complex custom logic is needed. Writing such custom, often complex logic is expensive, laborious, time-consuming, and adds further debugging needs. Complex conventional software tools generate such custom logic. Thus, writing custom complex logic requires writers to be versed in using complex circuit design tools.

Some conventional logic analyzers have a mechanism for a user to interface with it. However, some conventional logic analyzer interfaces have only a single point of execution. Also, they are not very user friendly. Conventional multi-channel logic analyzers have limited usefulness and lack user friendliness. For some number of logic inputs, conventional multi-channel logic analyzers allow monitoring some sequence of events. However, conventional multi-channel logic analyzers are problematic because there are no logical groupings for the inputs, and making logical connections between the inputs is laborious and confusing.

Conventional debugging software applies scripting techniques and has few or no user interfaces. They can be time demanding, even where they support multiple event occurrences. Upon execution of multiple sequences, conventional software debugging tools await a breakpoint. Upon reaching particular breakpoints, they may look for a certain conditions. However, their checking is not occurring at the high speeds at which the hardware they are observing runs. Thus, conventional software debugging tools typically cannot react rapidly to multiple deep sequences. Also, some of them may tend to be somewhat complicated to use. Setting up a single check may require several hundred lines of code, all of which needs to be debugged itself before use. Conventional debugging software may thus require inordinate time, labor and related costs and may not be perceived as particularly user friendly.

SUMMARY OF THE INVENTION

A graphical user interface is disclosed according to an embodiment of the present invention that is very helpful in facilitating the programming of programmable threads (e.g., engines) and the chain logic that can be used to combine one or more programmable threads for performing complex event functionality. Multiple event engines can each be programmed by a random access memory (RAM) to monitor signals and then perform trigger events based on the signals. Multiple threads can be combined to perform complex events by chain logic units. The event threads can be made to traverse different states, wherein one state traverses to another when its programming events are reached. The RAM controls the programming of the state information, the thread engines, and the chain logic.

Embodiments of the present invention include a graphical user interface with a state summary window for displaying multiple state information, each state information containing threads and state logic. When selecting a particular state information, a user can select from multiple thread windows and a state logic window. Each thread window illustrates the conditions under which a thread will be satisfied. Multiple threads are allocated for and can be defined for each state information. The state logic allows multiple threads to be combined for realizing complex expressions and also indicates the action that will occur when a thread (or multiple thread condition) is satisfied, e.g., a signal is generated or another state is entered. The user can interface with the windows of this graphical user interface for programming complex breakpoint expressions. Information obtained from this graphical user interface is directly used for programming programmable thread logic of a programmable in-circuit emulator unit. This programmable logic is used to implement high-speed programmable breakpoints and events that are useful for many applications, e.g., debugging purposes of a programmable microcontroller.

BRIEF DESCRIPTION OF THE DRAWINGS

FIG. 6 is an exemplary structure that may be used to program a memory array with values to configure an event engine, according to embodiments of the present invention.

FIG. 9 is an exemplary data structure that may be used to program a memory array with values to configure an event engine, according to embodiments of the present invention.

FIG. 12 is an exemplary data structure that may be used to program a memory array with values to configure combinational logic, according to embodiments of the present invention.

FIG. 13 is a table illustrating how values in the data structure of FIG. 12 may be used to implement various Boolean expressions, according to embodiments of the present invention.

FIG. 14 is a table illustrating how values in the data structure of FIG. 12 may be used to implement various complex Boolean expressions, according to embodiments of the present invention.

FIG. 18B illustrates tables describing output signals of chain logic blocks, according to embodiments of the present invention.

DETAILED DESCRIPTION OF THE INVENTION

In the following detailed description of the present invention, an interface for an event architecture, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Section I

Embodiments of the present invention are directed to a graphical user interface (GUI) for programming an event engine. The description of the GUI commences at Section II at FIG. 24. Presented first, Section I, A-D, FIGS. 1–23 represent a discussion of the event engine to provide context to the GUI discussion.

IA. Re-Configurable Event Engines

Embodiments of the present invention may be able to reconfigure an event engine by use of programmable event threads. In this fashion, the underlying hardware may be able to be used to execute many different states and realize complex breakpoints and other events. This may allow embodiments of the present invention to implement an event engine that supports very large numbers of states in the event thread, without dedicating hardware to perform a single state of an event thread.

Figure 1:
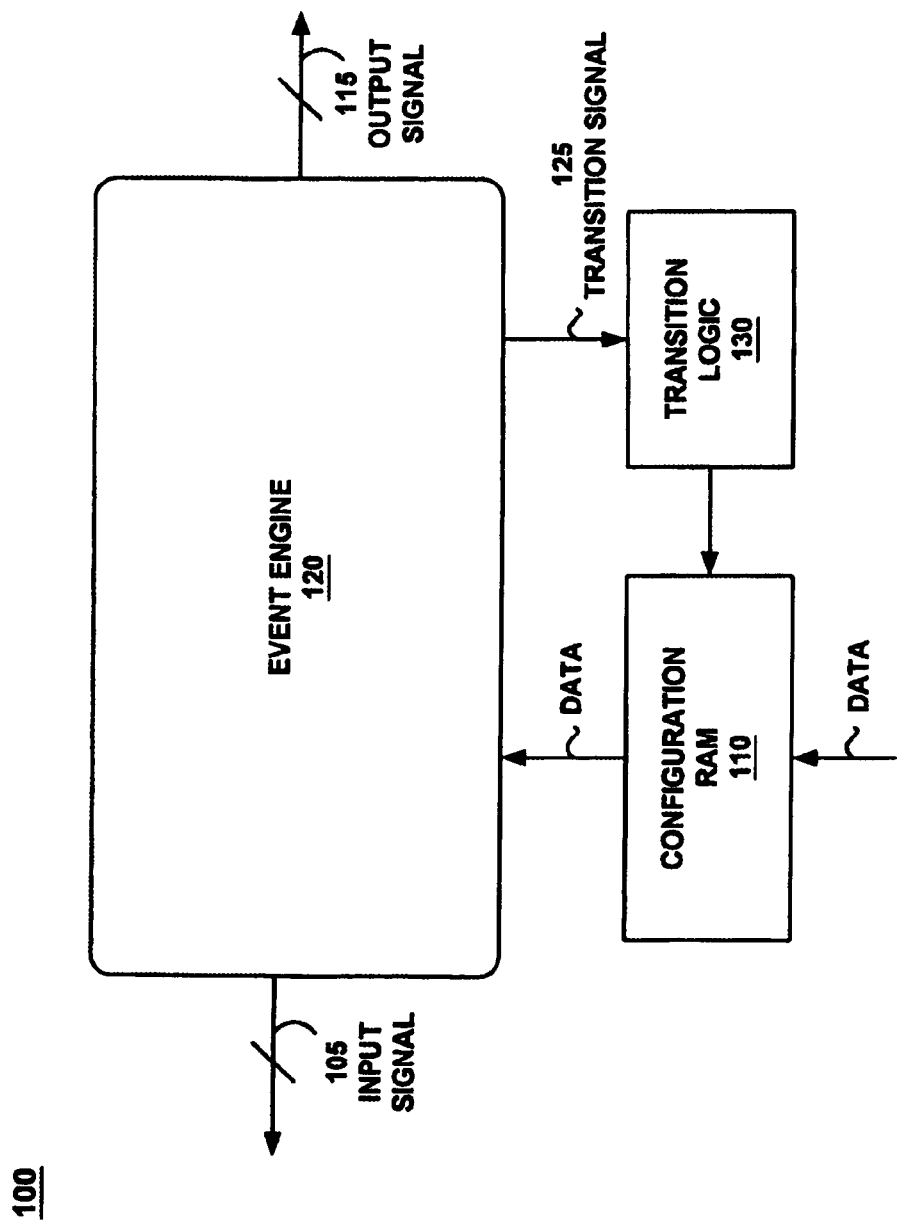
FIG. 1 is a block diagram of a device for implementing a programmable event engine, according to embodiments of the present invention

FIG. 1 illustrates an embodiment of a device 100 for implementing an event engine 120. The device 100 may comprise programmable logic 110 (e.g., a memory array) for storing data to define a number of states in an event thread to be executed by the event engine 120. Throughout this description, the event engine 120 may also be referred to as execution logic 120. Throughout this description, the programmable logic 110 may also be referred to as configuration RAM 110. A designer who may be testing and debugging a circuit or software may define the event thread using a software package. The data defining the event thread may then be loaded into the configuration RAM 110. A first portion of the data stored in the configuration RAM 110 may be used to configure or to program the event engine 120 to execute a state of the event thread. Then, new data may be loaded from the configuration RAM 110 to reconfigure the event engine 120 to execute the next state of the event thread. One embodiment uses 64 bytes per state. Therefore, a substantial number of states may be programmed into the configuration RAM 110.

Still referring to FIG. 1, the event engine 120 may receive a number of inputs 105 and may be configured by the data in the configuration RAM 110 to select between the inputs 105. The event engine 120 may also be configured to look for a condition or event with respect to a selected input signal. Upon the condition's occurrence, the event engine 120 may output none, one, or multiple signals 115. The output signal(s) 115 may be used to initiate an action, such as a breakpoint, setting a trace buffer on or off, toggling an external trigger, etc. The event engine 120 may also be configured by the data in the configuration RAM 110 to select which signal it should output upon detection of the condition or event. The event engine 120 may also output a transition signal 125 when the condition it was configured to look for occurs.

The transition signal 125 may be fed into transition logic 130, which upon receiving the transition signal 125, may cause a new state to be entered by loading data out of the configuration RAM 110 to re-configure the event engine 120. In this fashion, the event engine 120 may be reconfigured on-the-fly or during the execution of an event thread.

Figure 2:
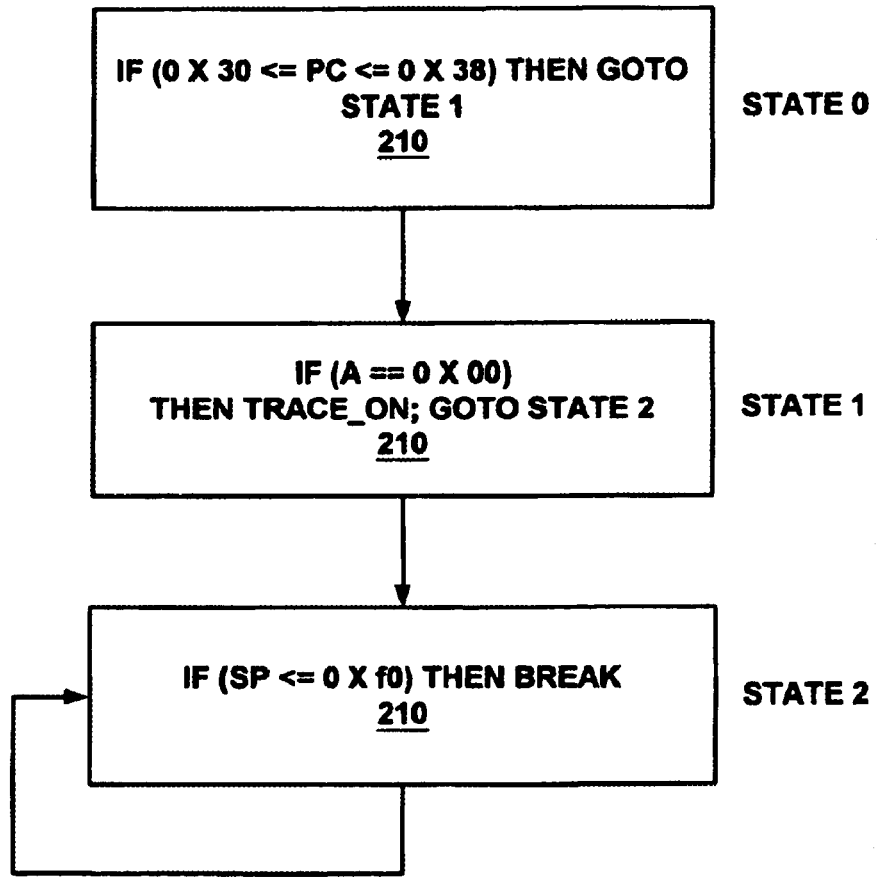
FIG. 2 is a diagram illustrating an event thread, which embodiments of the present invention may execute.

FIG. 2 illustrates an exemplary event thread 200 that may be executed in the event engine 120 of FIG. 1 and also in other embodiments of the present invention. The exemplary event thread 200 has three event cells 210; each event cell 210 may correspond to one state of the event thread 200. Embodiments may program or load the configuration RAM 110 with data that describe the event thread 200. In this example, during state 0, some of the data is used to configure the event engine 120 to monitor for the condition of the program counter being between 0x30 and 0x38. When this condition occurs, the event engine 120 may be put into state 1 by the transition logic 130. This may cause the configuration RAM 110 to reconfigure the event engine 120 to monitor for the condition of the accumulator equal to 0xcc. When this condition occurs, the event engine 120 may cause a trace to be turned on by outputting an appropriate signal. Additionally, state 2 may be loaded. In state 2, the event engine 120 may look for the condition of the stack pointer greater than or equal to 0xf0. When this occurs, the event engine 120 may cause a breakpoint signal to be output, which may stop the execution of, for example, code running in a microprocessor. When this occurs, state 2 may be reloaded, which may cause the event engine 120 to continue to monitor the stack pointer and to issue a break signal when, for example, the stack pointer is out of a valid range.

Figure 3:
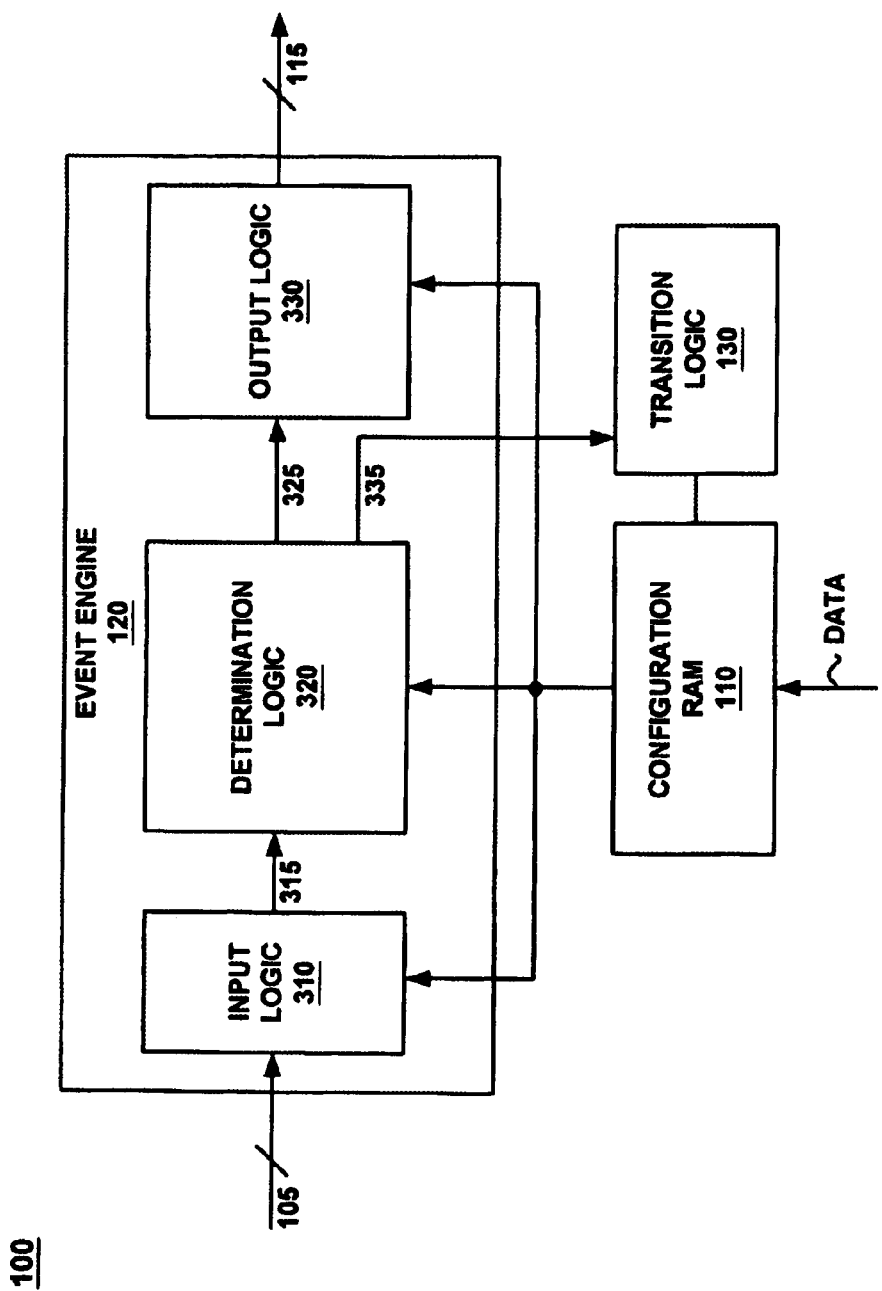
FIG. 3 is a block diagram of a device for implementing a programmable event engine, according to embodiments of the present invention.

Referring now to FIG. 3, to select between a number of inputs 105, the event engine 120 may have input logic 310 coupled to the configuration RAM 110. The input logic 310 may be configurable to select between a plurality of inputs 105 in response to the data from the configuration RAM 110. In this fashion, the input logic 310 is re-configurable when entering the new state by data from the configuration RAM 110. For example, in state 0 of FIG. 2, the input logic 310 may be configured to select the program counter, which may feed the determination logic 320. When the event engine 120 transitions to state 1, the input logic 310 may be reconfigured to select the accumulator, which may feed into the determination logic 320.

Still referring to FIG. 3, determination logic 320 may be coupled to the configuration RAM 110 and may be configurable by data from the configuration RAM 110 to detect a condition with respect to a selected input 315. Throughout this description, the determination logic 320 may also be known as detection logic 320. The determination logic 320 may also issue a trigger or hit signal 325 upon detection of the condition. The determination logic 320 may be re-configurable to detect a new condition during the new state. For example, in state 0 of FIG. 2, the determination logic 320 may be configured to look for the condition of the selected signal 315 fed to it by the input logic 310 (e.g., the program counter) being in a certain range. When the next state is entered, the determination logic 320 may be reconfigured by new data from the configuration RAM 110 to look for the condition of the selected signal 315 being equal to 0xcc, for example.

When the selected signal 315 is within the specified range, the determination logic 320 may also output a transition signal 335 to the transition logic 130. However, the same signal may be used for both the trigger signal 325 and the transition signal 335.

Still referring to FIG. 3, the event engine 120 may further have an output (or output logic) 330 coupled to the configuration RAM 110. The output 330 may be configured by data from the configuration RAM 110 as to which signal of a plurality of signals 115 it is to output upon receiving the trigger signal 325. For example, the output logic 330 could send out a breakpoint signal, an external trigger signal, a trace on/off signal, etc.

Figure 4:
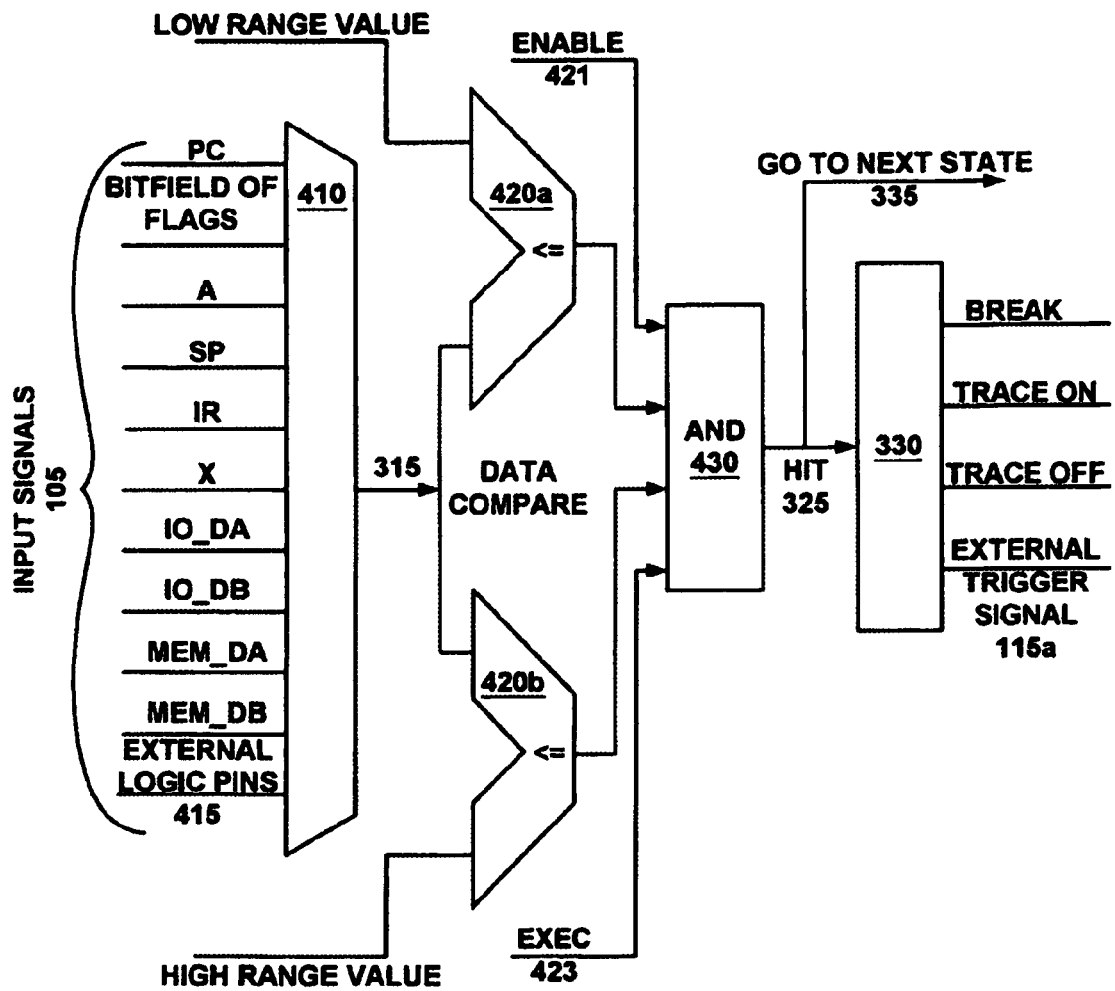
FIG. 4 is a block diagram of logic for executing an event thread, according to embodiments of the present invention.

FIG. 4 illustrates an embodiment of the event engine 120, in which the determination logic 320 is performed by a comparator. The input logic 310, in this embodiment, comprises a multiplexer 410 which inputs a number of input signals 105, which may include the program counter (PC), a bitfield of flags, the accumulator (A), the stack pointer (SP), the instruction register (IR), scratch register (X) (or index register), I/O data address (IO_DA), I/O data byte (IO_DB), memory data address (MEM_DA), memory data byte (MEM_DB), and external logic pin signals 415. Embodiments are suitable to receive any desired input. In this case, the inputs may be various signals and values of interest when testing and debugging a circuit or software.

The determination logic 320, in this embodiment, may comprise two comparators 420a, 420b. The upper comparator 420a may be fed a low range value, which may come from the configuration RAM 110. The lower comparator 420b may be fed a high range value, which may also come from the configuration RAM 110. As described herein, a user may enter data into a design program to build various data structures to implement the various event cells 210. For example, the user may input a low range value and a high range value for a given state of an event thread 200. Those values may be loaded in the configuration RAM 110 and then fed to the comparators 420a, 420b when the event engine 120 is to execute the given state of the given event thread 200.

Rather than using comparators, embodiments may use combinational logic, a mathematical block, or some arbitrary block of logic to see if the selected input signal 315 meets a condition specified by the data in the configuration RAM 110.

The comparators 420a, 420b may also be fed with the selected input signal 315. The determination logic 320 may also comprise a logical AND 430, which may have, as inputs, the output of each comparator 420a, 420b, an enabled bit 421, and an execute bit 423. The enabled bit 421 may be specified by the user and may be a part of the data stored in the configuration RAM 210. The enabled bit 421 may control whether a given event cell 210 will be executed. The optional execute bit 423 may allow a signal to be fed in from logic peripheral to the event engine 120. Thus, the event engine 120 may be effectively controlled by logic external to the event engine 120. For example, by preventing or allowing the decision logic 320 to output the trigger signal 325 and/or the transition signal 335, the event engine 120 and hence the event engine 120 may be controlled by external logic (not shown).

The determination logic 320 outputs a trigger signal 325 if all of the inputs to the logical AND are true. In the present embodiment, the output 330 is shown outputting, in response to the trigger signal 325, four different signals, which may be used to execute a break, to put trace on or off, or to initiate an external trigger, for example. The trigger signal 325 may also be fed into logic, such as transition logic 130, to cause the next state to be loaded. Alternatively, there may be a separate transition signal 335 and trigger signal 325, with one or the other not influenced by the execute bit 423 or influenced by a second bit. Thus, embodiments are able to output a signal 115, such that an action such as a breakpoint is initiated, without advancing to the next state of the thread 200. In a similar fashion, embodiments are also able to advance to the next state of the thread 200 without outputting the signal 115.

Figure 5:
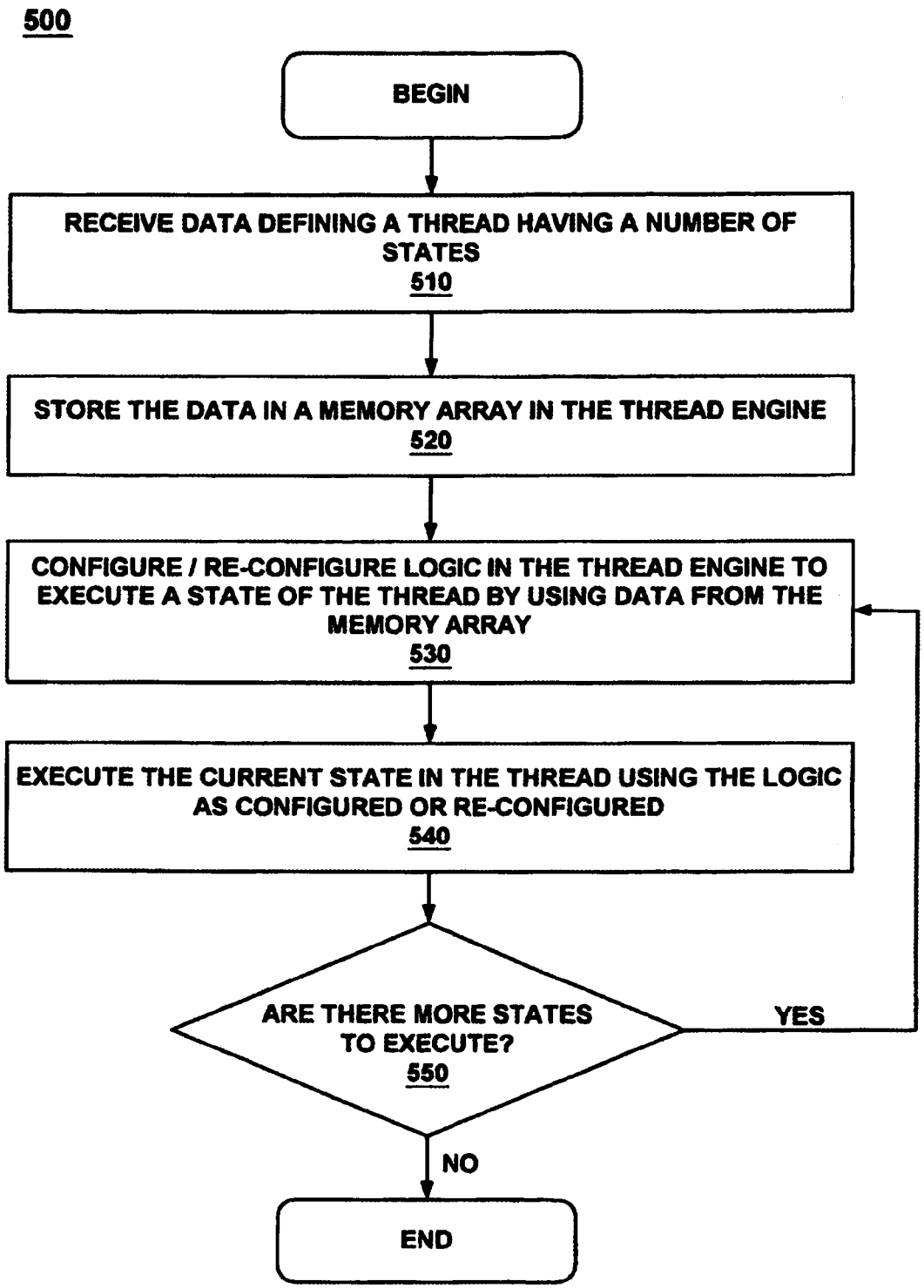
FIG. 5 is a flowchart of steps of a process of executing an event thread, according to embodiments of the present invention.

Referring now to process 500 of FIG. 5, an embodiment provides for a method of executing an event thread 200. Step 510 may comprise receiving data defining an event thread 200 having a plurality of states as defined by event cells 210. For example, the event engine 120 may receive this data from the configuration RAM 110.

In step 520, the data may be stored in a configuration RAM 110 coupled to the event engine 120. For a given state of the thread 200, the data may define a condition to monitor for with respect to a selected input 315. The data may also define one or more actions to take upon the condition being met. The output logic 330 outputs a signal 115 to cause the action, such as initiating a breakpoint or setting trace on or off, etc. Optionally, the data may define that no action be taken.

Step 530 may comprise configuring the event engine 120 to execute a state of the thread 200 by using data from the configuration RAM 110. Thus, the input logic 310 may be configured to select between a number of input signals 105 and to output the selected signal 315. The determination logic 320 may be configured to determine if a selected input 315 meets a condition (e.g., an event is detected). The output logic 330 may be configured to select between a plurality of signals (e.g., it outputs one or more of the signals, such as breakpoint, trace on/off, toggle external trigger, etc.). This step may be repeated to execute additional states by re-configuring the event engine 120 by using additional data from the configuration RAM 110.

In step 540, the event engine 120 may execute the current state, as it has been configured or re-configured. In embodiments in which the event engine 120 is divided into several components (e.g., input logic 310, determination logic 320, and output logic 330), one or more of the components may be re-configured to execute the next state.

Step 550 may comprise a determination of whether there has been a transition to a new state. If so, step 530 may be repeated. Thus, the event engine 120 may be reconfigured during the execution of an event thread 200. If there has not been a transition, step 540 of the process 500 may be repeated.

Referring now to FIG. 6, an exemplary event cell data structure 600 for defining an event cell 210 is illustrated (e.g., a 16-bit event cell 210). Thus, the event cell structure 600 may be used to specify a single event thread state 210. While the exemplary structure is 64 bits, any suitable size may be used. Multiple such event cell structures 600 may be chained together to define the data for an event thread 200. Referring now to word 0 of the event cell structure 600, bit 31 may be for event thread enable. If this bit is off, then all of the associated control logic may be off and the event thread is not used. In this fashion, event threads 200 that are not being used may be turned off. Or an event thread 200 may be run for several states and then turned off. This may be implemented, for example, by feeding the enabled bit 421 in FIG. 4 into the AND logic 430.

Still referring to FIG. 6, bits 30:25 are the 'next' field, which may contain a pointer to the location of the next event cell data structure 600, and hence the next state in the event thread 200. This may allow a user to chain event cells 210 together by specifying the next event cell 210 to be executed in this field. If the event thread 200 meets its current condition, it may will transition to the state specified in this field. Bit 24 is an invert decision bit and may invert the output of the determination logic 320 (e.g., the trigger signal 325).

Figure 7:
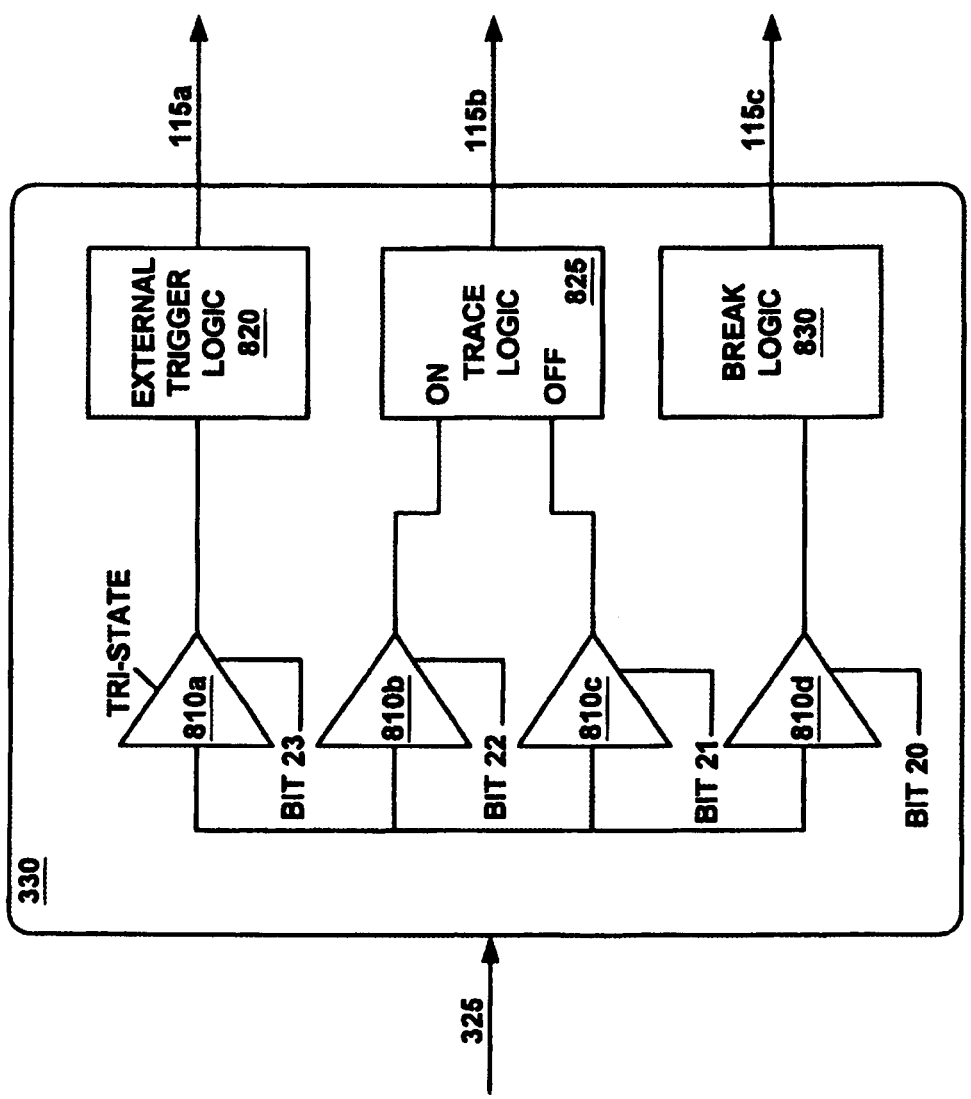
FIG. 7 illustrates exemplary output logic for an event engine, according to embodiments of the present invention.
Figure 8:
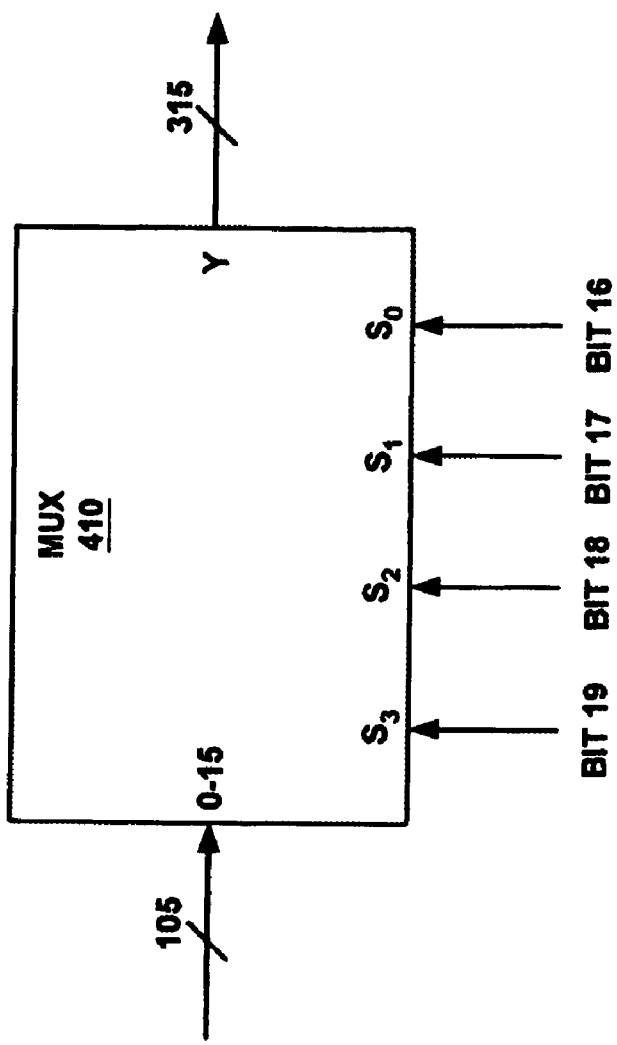
FIG. 8 illustrates exemplary input logic for an event engine, according to embodiments of the present invention.

In one embodiment, bits 20–23 may act as enables to tri-state buffers. Referring now to FIG. 7, the trigger signal 325 may be input to the output logic 330, which may have a number of tri-state buffers 810. If a tri-state buffer 810 is enabled then the trigger signal 325 may pass through tri-state 810 to its associated logic. For example, if bit 23 (external trigger bit) is set, it may enable tri-state buffer 810a, which may allow the trigger signal 325 to propagate through to the external trigger logic 820, which may toggle the value of an external logic pin. Bit 22 and 21 may be for setting trace on and trace off. The value of these bits may be fed into tri-state buffers 810b and 810c, respectively. In this fashion, the trace logic 825 may cause the trace signal 115b to be turned on or off when a condition occurs and the trigger signal 325 is propagated through. Bit 20 may be for initiating a break signal 115 and may be fed into the tri-state buffer 810d. Thus, when a condition is detected the break logic 830 may output a break signal 115c provided tri-state 810d is enabled. The output logic 330 may output many other signals, as well.

Embodiments allow multiple event engines 120 to be operating concurrently. In these embodiments, there may be a logical scheme to decide what to do when event engines 120 issue contradictory signals 115. For example, if one event engine 120 issues a signal 115 to turn the trace on and another issues a signal 115 to turn the trace off, the trace may be turned on to be sure information is stored. Any suitable scheme may be used when there is a conflict between signals 115 from different event engines 120.

Referring again to FIG. 6, bits 19:16 may control the input logic 310. For example, referring to FIG. 8, in one embodiment, bits 16–19 are fed into a multiplexer 410 to select between the inputs 105. The output of the multiplexer 410 may be the selected signal 315. The data format of FIG. 6 shows one method of allowing the user to specify which of the exemplary signals 105 is to be selected by the multiplexer 410.

Still referring to FIG. 6, bits 15:0 are for a counter start value and may allow the user to specify how many times a condition happens before the before the determination logic 320 generates a trigger signal 325 to initiate taking an action (e.g., outputting signal 115) and entering the next state. Thus, these bits may be fed into a counter logic (not shown), which is coupled to the determination logic 320.

Still referring to FIG. 6, word 1 of the exemplary data format may be used for range compare. Bits 31:16 are for a high word of the range compare and may specify the maximum value to look for. These bits may be fed into the upper comparator logic 410a, for example. Bits 15:0 specify the minimum value to look for in the range compare, and may be fed into the lower comparator logic 410b, for example.

Structure 900 of FIG. 9 is an exemplary data format for an eight-bit event cell 210. The present invention may use other formats with different fields. Bits 31:20 of word 0 are similar to the corresponding bits of the 16 bit exemplary structure 600. Bits 19:16 may define what the input logic 310 selects. Bits 15:0 are for the counter start value.

Referring now to word 1 of structure 900, bits 31:24 are reserved. Bits 23:16 may specify the maximum value for the range compare. Bits 15:8 are for bit masking and may be used to specify active bits for the compare. For example, active bits may be marked with a zero. Bits 7:0 are for the minimum value for range compare.

IB. Chaining Event Threads

Figure 10:
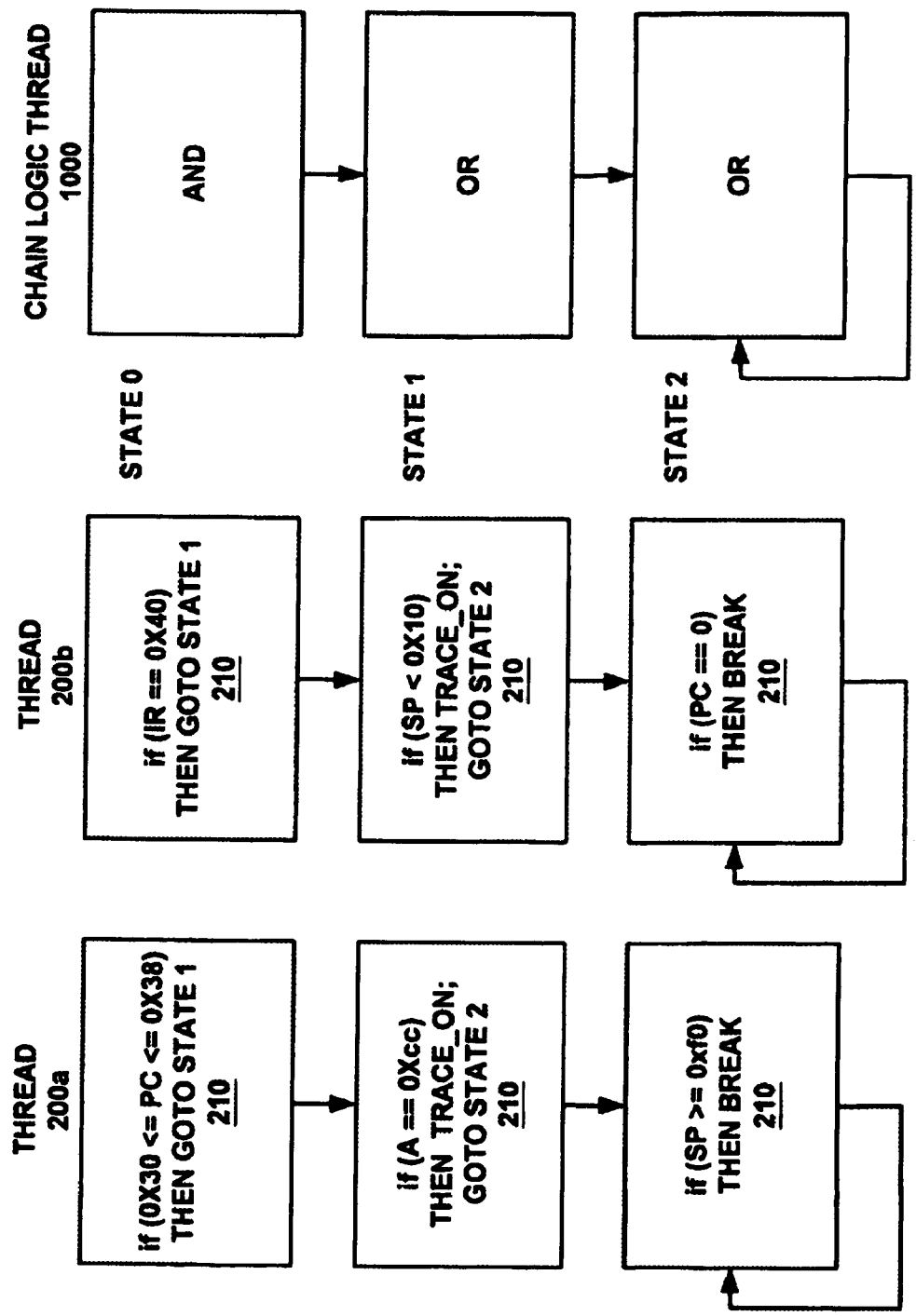
FIG. 10 is a flowchart illustrating a process of chaining event threads, according to embodiments of the present invention.

Referring now to FIG. 10, embodiments of the present invention provide for chaining together multiple event threads 200. An example of two event threads 200 that are chained together is illustrated in the flow diagram of FIG. 10. Thread 200a may be analogous to the thread illustrated in FIG. 2. Thread 200b has three states that are executed in parallel with the three states of thread 200a. For example, each event thread 200 may advance to its next state at the same time as the other event thread 200. However, when event threads 200 are chained, the next state may be entered based on a logical combination of signals from the event threads 200. For example, each event thread 200 may produce a hit signal 325 when a condition occurs. These hit signals 325 may be logically combined according to a Boolean expression formed by a logical operator in the given state in the chain logic thread 1000.

An example of such a logical combination will be discussed by referring to FIG. 10. In state 0, event thread 200a is testing for the occurrence of the program counter being between 0x30 and 0x38, while event thread 200b is testing for the condition of the instruction register equal to 0x40. In state 0, the chain thread 1000 has a logical operator of AND. Thus, the Boolean expression of "(thread 200a condition) AND (thread 200b condition)" may be formed. The event threads 200 may not advance to state 1 until the Boolean condition is true.

When the Boolean condition for state 0 is true, state 1 may be entered in which event thread 200a tests for the condition of the accumulator equal to 0xcc. During state 1, event thread 200b may test for the condition of the stack pointer less than 0x10. Based on the logical operator in state 1 of the chain logic thread 1000, the Boolean expression is "(accumulator=0xcc) OR (stack pointer <0x10)." Thus, state 2 may be entered when either condition is satisfied. In this case, both event threads 200a, 200b may issue a signal to set the trace on when their condition is satisfied. Since the logical operator is OR, the event thread 200 which caused the Boolean expression to be true may also cause the trace to turn on.

Embodiments of the present invention also provide for cases in which the logical operator is, for example, an AND with two or more event threads 200 triggering events upon the condition for which they are testing being satisfied. For example, if state 1 of the chain event 1000 were a logical AND, then the event threads 200a and 200b may not advance to state 2 until both conditions are satisfied. However, the trace may be set on when either event thread 200a or 200b has its condition satisfied. Alternatively, embodiments may require that the Boolean expression be true for the trace to be set to on.

Still referring to FIG. 10, in state 2, the Boolean expression that is formed is "(stack pointer >=0xf0) OR (program counter=0)." In this case, the action that may be triggered is a break (e.g., a break in the operation of the underlying software under test). State 2 is then repeated. While the embodiment illustrated in FIG. 10 comprises two event threads 200, embodiments of the present invention are suitable to chaining together large numbers of event threads 200. Furthermore, logical operators such as, for example, NAND and NOR, may be applied to the event threads 200 in addition to AND and OR.

Figure 11A:
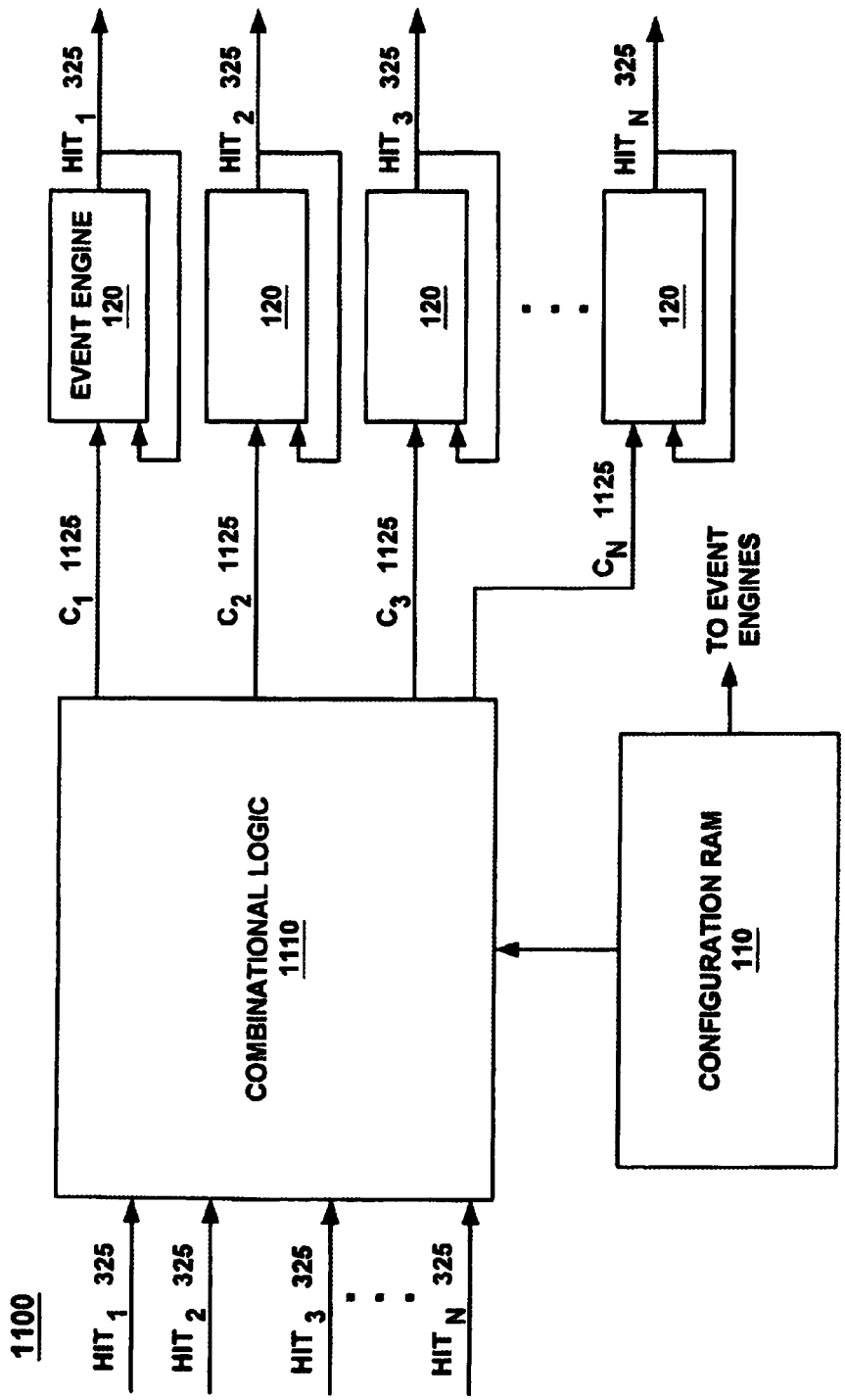
FIG. 11A is a block diagram of a device comprising chained event engines, according to embodiments of the present invention.

Referring now to FIG. 11A, embodiments of the present invention provide for chaining together multiple event threads 200 that are executed in event engines 120. Throughout this description the phrase "chained event threads 200" may be equivalent to the phrase "chained event engines 120." The device for chaining event threads 1100 of FIG. 11A may have combinational logic or a chain logic block 1110, which may be programmed or configured by data stored in the configuration RAM 110 (e.g., a memory array or programmable logic) to output the result of a Boolean expression that is formed with selected inputs. Throughout this description the term re-configurable combinational logic may comprise the combinational logic 1110, the configuration RAM 110, as well as other elements. The selected inputs may be chosen from the hit signals 325 that the event engines 120 produce in response to the occurrence of various conditions or events. In this fashion, the event threads 200 are chained together. However, the present invention is not limited to selecting the hit signals 325 as the operands in the Boolean expressions.

The event engines 120 may be programmed by the configuration RAM 110 to execute event threads 200 as discussed herein. The event threads 200 that run in the event engines 120 may be chained or run independently. The combinational logic 1110 may output a chain logic signal 1125 to each event engine 120. The chain logic signal 1125 may be formed from the result of a Boolean expression formed from selected input (e.g., hit) signals 325, along with a condition that may determine whether an event engine 120 is to be part of a chain. For example, to run all of the event threads 200 in the event engines 120 independently, the combinational logic 1110 outputs chain logic signals 1125 of: C1=C2=C3=Cn=true. In this fashion, the event engines 120 all see a true input from the combinational logic 1110 and thus are not affected by the input signal. To run any single event engine 120 independently, the combinational logic 1110 feeds it a "1". Event engines 120 that are chained may see a chain logic signal 1125 that has the same value and whose value may depend on whether a Boolean condition is true. The hit signals 325 of the event engines 120 may also be fed back into the event engines 120.

Referring briefly to FIG. 4, an embodiment inputs a signal (e.g., signal 1125) from the combinational logic 1110 as the enabled bit 421 into the logical AND 430. In this fashion, if the enabled bit 421 is true, the output of the AND 430 may be controlled by the other inputs to the AND 430. The hit signal from the event engine 120 may be taken from a gate (not shown) which combines the inputs of the AND gate 430 except the enabled bit 421. In this fashion, when the condition for which the event engine 120 tests for is satisfied, a hit signal 325 may be output to the combinational logic 1110.

Figure 11B:
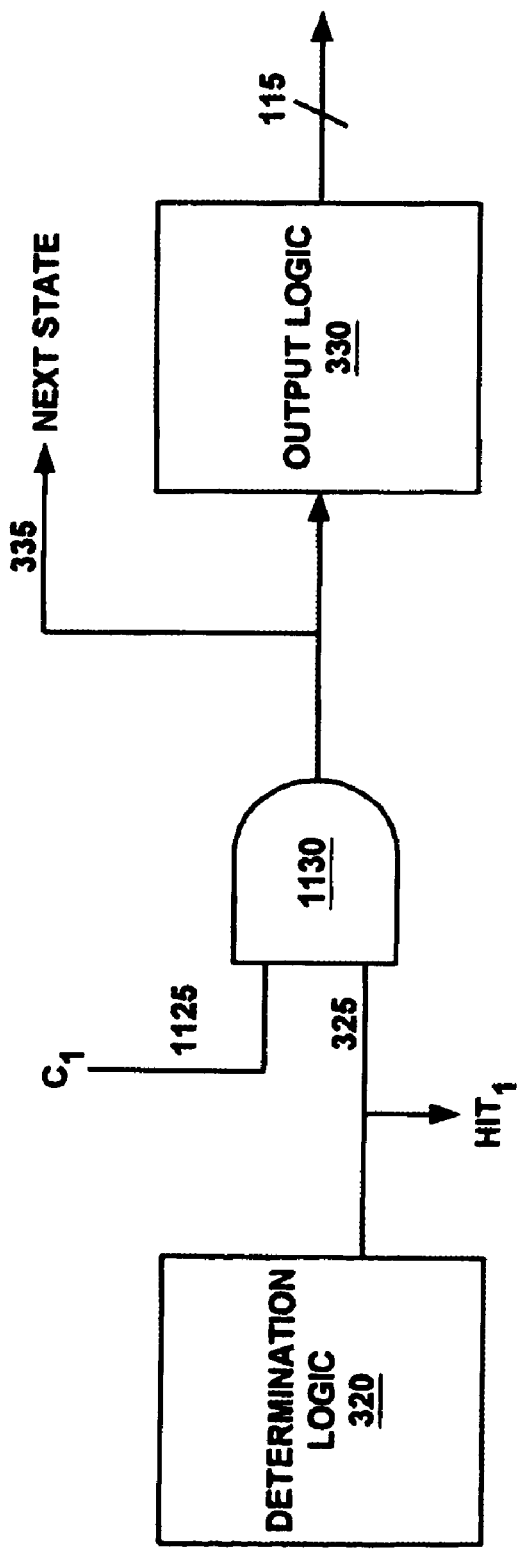
FIG. 11B and FIG. 11C are block diagrams illustrating a signal input into a portion of an event engine, according to embodiments of the present invention.

This technique may also be performed by the embodiment illustrated in FIG. 11B, in which a signal 1125 (e.g., C1) from the combinational logic 1110 is input to the AND gate 1130, which may also input the trigger or hit signal 325. The hit signal 325 may also be fed to the input of the combinational logic 1110. The output of the AND gate 1130 may be input to the output logic 330 and may also be used as the transition signal 335, which may be fed into transition logic 130. Each event engine 120 may have a signal 1125 (e.g., C1, C2, etc.) fed from the combinational logic 1110, though not necessarily the same signal. Those event engines 120 running the event threads 200 that are being chained may have the result of the Boolean expression input into their respective AND gates 1130. However, those that are not being chained (e.g., are being run independently) may have a logic "1" input. If signal C1 is always "1", the output of the AND 1130 may be controlled by the hit signal 325. In this fashion, when the event engine 120 is not a part of a chain, it may execute independently.

When an event engine 120 is chained, the signal 1125 (e.g., C1) may be equal to the result of the Boolean expression, and the output of the AND gate 1130 may be "0" while the Boolean expression is false. In this case, the next state may not be entered and no actions may be triggered by the output logics 330 of any of the event engines 120. When the Boolean expression is true, the event engine(s) 120 which produced a hit signal(s) 325 may have a logical "1" at the output of their AND gate(s) 1130, which may trigger a next state and may also will trigger the output logic(s) 330 of the event engine(s) 120 which produced a hit signal(s) 325. The next state may be initiated in all of the chained event engines 120 by having the memory array 110 send the data for the next state to each chained event engine 120.

Figure 11C:
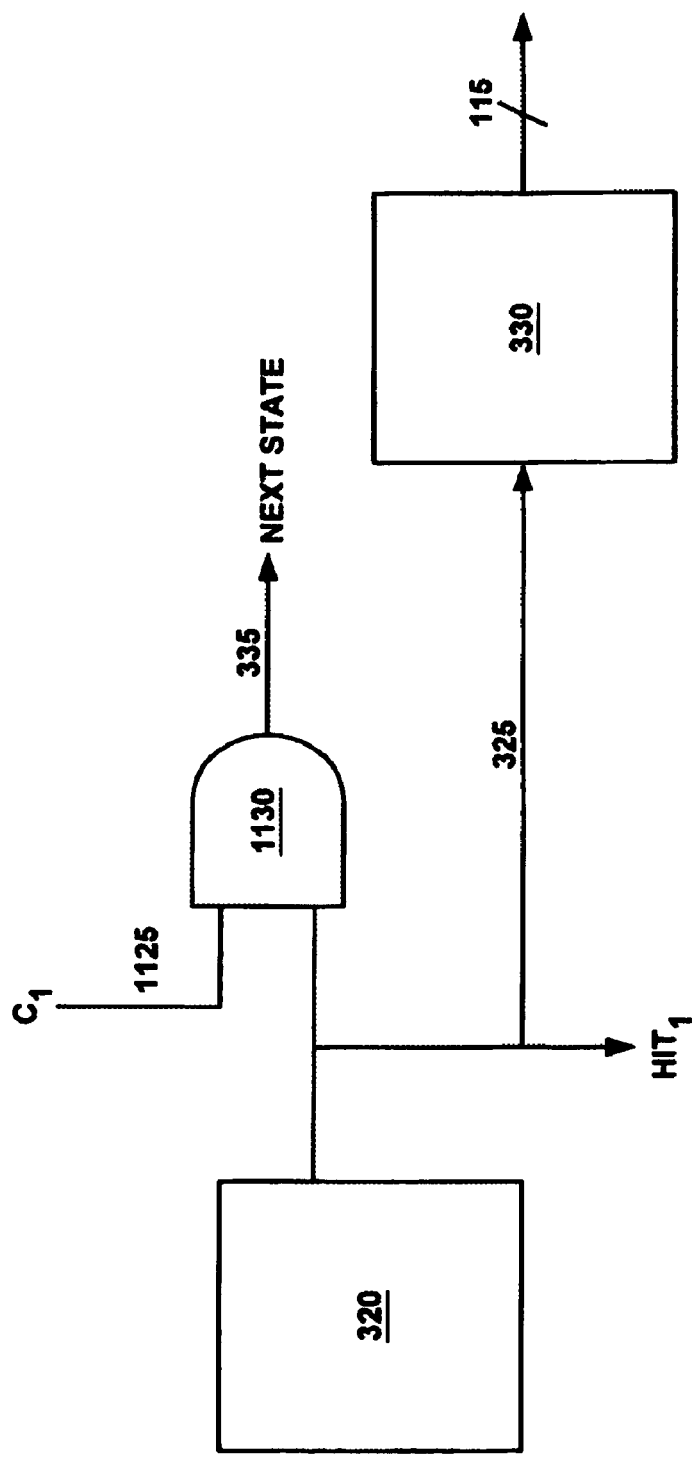
Figure 15:
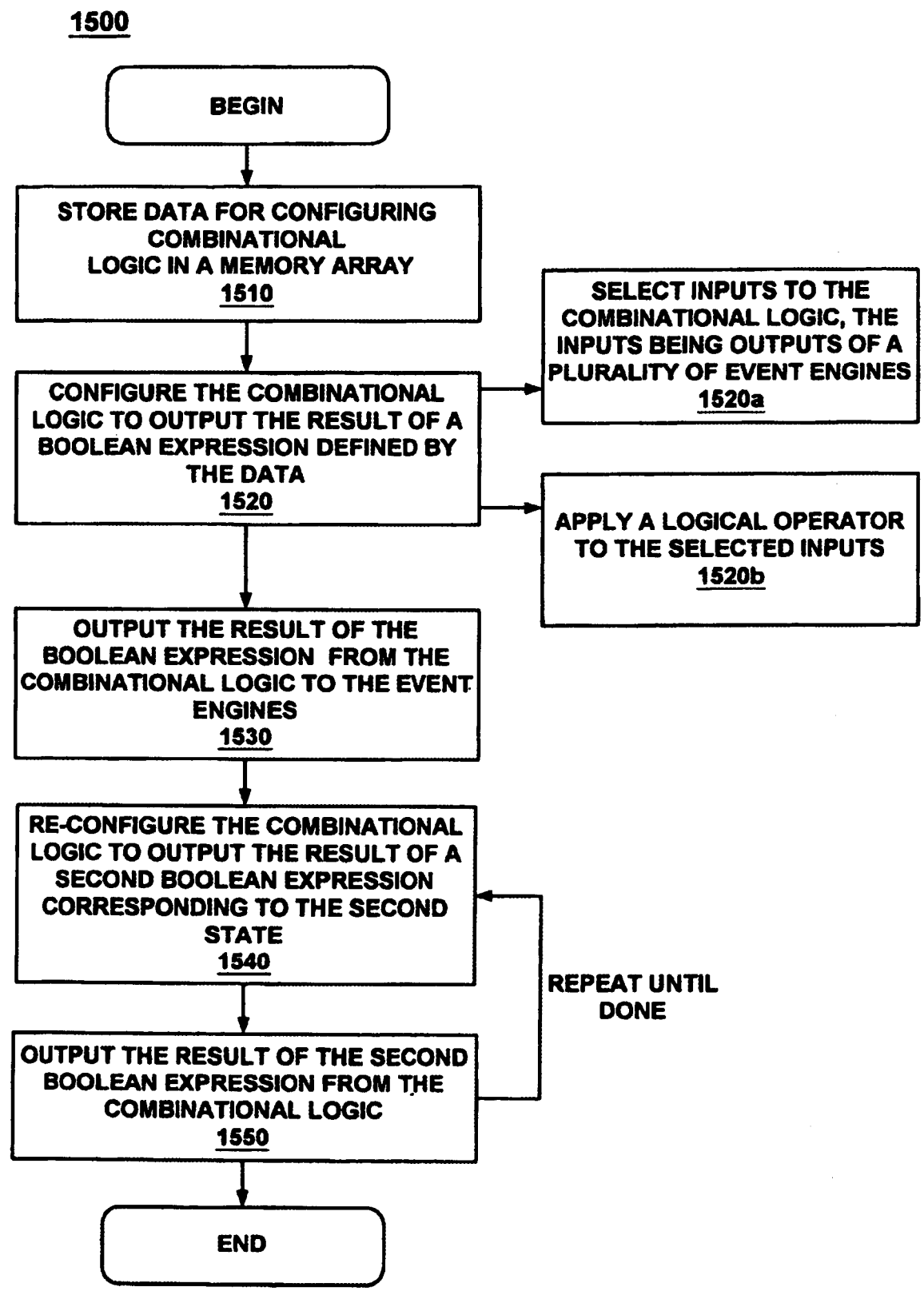
FIG. 15 is a flowchart illustrating a process of chaining event threads, according to embodiments of the present invention.

In some cases, it may be desirable to trigger an action when the event for which a chained event engine 120 is testing for is satisfied, even if the next state is not to be entered because the Boolean expression is false. Referring now to FIG. 11C, a block diagram is illustrated to implement such an embodiment. In this embodiment, the input to the output logic 330 may be received directly from the trigger or hit signal 325. In this fashion, the action may be triggered by the output logic 330 regardless of the result of the Boolean expression (e.g., regardless of the value of signal 1125 or C1). However, the next state may still be triggered by the combination of the trigger or hit signal 325 and the output signal 1125 (e.g., C1) of the combinational logic 1110. The present invention is not limited to the methods illustrated in FIGS. 11B and 11C for inputting the result (e.g., signal 1125) of the Boolean expression into the event engines 120 and for producing next states and output actions from the output logic 330.

Referring now to FIG. 12, an exemplary chain data structure 1200 that is used to configure a chain logic block 1110 is shown. A single chain data structure 1200 may be used to configure the chain logic block 1110 for a single state and may be used to chain together a number of event threads 200.

Bits 30:24 specify a pointer to the next chain data structure 1200 to execute. Thus, these bits may specify the next slave chain logic state for the chain logic block 1110 to execute. In this fashion, the logical function (e.g., AND, OR, NAND, NOR) may be altered from state to state. Also, the event threads 200 that are being chained may be changed from state to state. Bit 17 is for an enable bit, which may enable the chain logic block 1110 that the chain data structure 1200 configures.

Bit 16 is an inverting bit, which may invert the result of the Boolean expression. For example, if the chain logic block 1110 was implementing "thread 0 AND thread 1," the invert may implement "NOT (thread 0 AND thread 1)."

Bits 15:0 may specify which event threads 200 are to be chained together. There is a positive logic enable and a negative logic enable for each event thread 200, which may allow the chain logic block 1110 to use the inverse of the input from a given event thread 120 in the Boolean expression. Both bits may be set to "0" to cause the chain logic block 1110 to ignore given the event engine 120. For example, it may not use the hit signal 325 from the given event engine 120 and it may output a constant logical "1" to the event engine 120 so that it is not affected by the combinational logic 1110.

In the example in FIG. 12, up to eight event threads 200 may be chained together. Embodiments of the present invention are able to chain together very large numbers of event threads 200. To do this, the data structure 1200 may be made larger to specify additional event threads 200. Then, the underlying chain logic block 1110 is made wider but not deeper. This may not slow down the chain logic block 1110 because embodiments implement the chain logic block 1110 with tri-state logic, as opposed to multiplexers.

As discussed herein, embodiments of the present invention are able to implement logical operators such as, for example, OR, AND, NOR, and NAND. The table 1300 illustrated in FIG. 13 demonstrates how various bits in the structure 1200 of FIG. 12 may be set to implement various logical operators. To form a logical OR, the chain enable bit (e.g., bit 17) may be set to "1" to enable this chain logic thread 1000. The invert output bit (e.g., bit 16) may be set to "1". For each event thread 200 to be chained, the positive logic enable may be set to "1". In this fashion, a logical OR may be created. For example, if the positive logic enables of event threads 7, 6, and 1 are set to "1", and if the event threads 200 are testing for the occurrence of conditions A, B, and C respectively, then the Boolean expression may be "A OR B OR C."

Still referring to Table 1300 of FIG. 13, a logical NOR may be applied to the event thread 200 conditions or events by setting the invert output bit to "0" and the enable bit to "1". For each event thread 200 to be chained, the positive logic enable may be set to "1". In this fashion, the expression "NOT (A OR B OR C)" may be formed using the exemplary event threads from the previous paragraph.

To form an expression with AND as the logical operator, the chain enable bit may be set to "1" and the invert output bit may be set to "0". For each event thread 200 to be chained, the positive logic enable may be set to "0" and the negative logic enable bit may be set to "1". Thus, an expression such as, "A AND B AND C" may be formed, where A, B, and C are conditions being tested for by separate event threads 200.

To form a logical NAND, the chain enable bit may be set to "1" and the invert output bit may be set to "1". The rest of the bits may be set as for the previously described logical AND.

Embodiments of the present invention are also able to form Boolean expressions in which selected inputs are inverted. For example, expressions such as "A(NOT) AND B AND C" may be created. The expression may be stored in the configuration RAM 110, which may be used to configure the combinational logic 1110. Referring now to FIG. 14, the table 1400 illustrates one way such expressions may be formed. For example, to form the Boolean expression, "A(NOT) OR B OR C," the chain enable and invert bits may be set to "1". The negative logic enable for event thread A may be set to "1". For event threads B and C, the positive logic enable bit may be set to "1". In this fashion, the expression may be stored in the configuration RAM 110, which may be used to configure the combinational logic 1110.

Similar expression may be formed with the logical operators AND, NOR, and NAND. For example, table 1400 illustrates one possible set of rules for forming the following expressions: "A AND B(NOT) AND C"; "NOT (A OR B(NOT) OR C)"; and "NOT (A AND B(NOT) AND C(NOT))."

An embodiment of the present invention provides for a method of chaining event engines 120. Referring now to Process 1500 of FIG. 15, in step 1510, data for configuring combinational logic 1110 may be stored in a configuration RAM 110. The data may allow the configuration logic 1110 to be configured to implement Boolean expression formed by selected inputs.

In step 1520, the combinational logic 1110 may be configured to output the result of a Boolean expression. This step may comprise sub-steps 1520a of selecting inputs to the combination logic 1110. For example, the inputs may be selected from available outputs of a number of event engines 120. This step may also include inverting one or more of the selected inputs.

Step 1520 may also comprise sub-step 1520b in which a logical operator may be applied to the selected inputs. For example, the logical operator may be defined as described herein with respect to the discussion of FIG. 13.

In step 1530, the combinational logic 1110 may output the result of the Boolean expression that it was configured to implement. The output may be fed into the event engines 120 that had their outputs selected as inputs to be used in the Boolean expression. In this fashion, the event engines 120 may be chained together by the Boolean expression. This step may also include inverting the result.

In step 1540, the combinational logic 1110 may be re-configured to output the result of another Boolean expression, based on further data from the configuration RAM 110. This re-configuration may comprise changing the logical operator from the previous Boolean expression. It may also include changing which event engines 120 are chained. For example, it may include changing which outputs from the event engines 120 are selected as inputs to be used in the new Boolean expression. It may also include changing which event engines 120 receive the output of the combinational logic 120 (e.g., the result of the Boolean expression).

In step 1550, the combinational logic 1110 may output the result of the new Boolean expression to the event engines 120 that were selected to be chained in this state. The process 1500 may repeat steps 1540 and 1550 until all states are executed.

Figure 16:
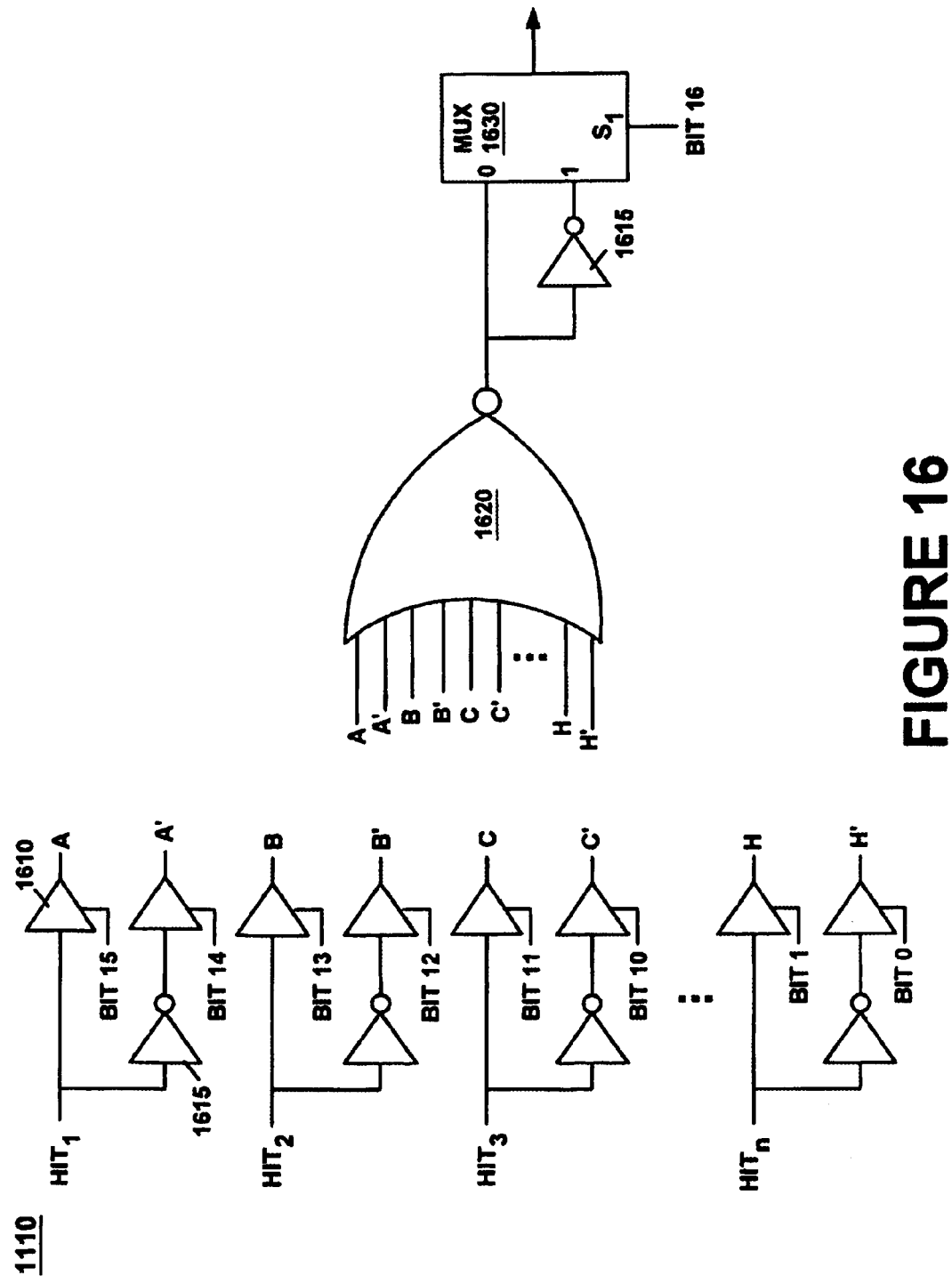
FIG. 16 is a diagram illustrating exemplary logic to implement re-configurable combinational logic, according to embodiments of the present invention.

FIG. 16 illustrates an exemplary logical block diagram for implementing the combinational logic 1110 including various bits from a slave chain logic data structure 1200. The hit signals 325 from the event engines 120 may be input into the combinational logic 1110 by splitting a given hit signal 325 (e.g., hit 1) into two signals. One of the signals 325 may be fed directly into a tri-state buffer 1610 and the other may be input into an inverter 1615 before a tri-state buffer 1610. Bits 15:0 of the slave chain logic data structure 1200 may control the tri-state buffers 1610, whose outputs may be input to the NOR gate 1620. In this fashion, the hit signals 325 that have their bits set to "1" in the slave chain logic data structure 1200 may have their signals input to the NOR gate 1620.

The NOR gate 1620 may have its output split with one branch going directly into the MUX 1630 and the other branch first going through an inverter 1615. Bit 16 (e.g., the invert output bit) of the slave chain logic data structure 1200 may be used to select the final output of the combinational logic 1110. The present invention is not limited to the logical circuitry illustrated in FIG. 16 for implementing the combinational logic 1110.

IC. Event System Architecture

Embodiments of the present invention are able to configure event engines 120 into multiple chains and reconfigure the chains on the fly. The event engines 120 may be allowed to run independently or may be chained in multiple chains. For example, the initial execution scheme may comprise two chains. The first chain may have two event engines 120 chained together with one monitoring for the PC to be outside a given range and the other event engine 120 monitoring for the accumulator going over a specified value. The second chain may comprise two other event engines 120 chained with one monitoring for a specified address being accessed and the other monitoring for a specific data value crossing the bus. If the first chain detects its condition (or combination of conditions for which its event engines 120 were configured to monitor), the configuration of the first two event engines 120 may be altered, without affecting the second two event engines 120. For example, if the PC goes out of range, the execution scheme may be re-configured by breaking the first chain. For example, the first two event engines 120 may execute independently to monitor two conditions that are different from when they were chained. As another example, in an initial execution scheme the event engines 120 may be monitoring for different conditions, but in a chained fashion, such that when any of them detects its condition, the execution scheme is modified. For example, the modification may be that all event engines 120 begin to execute independently, other chains of event engines 120 are formed, etc.

Figure 17:
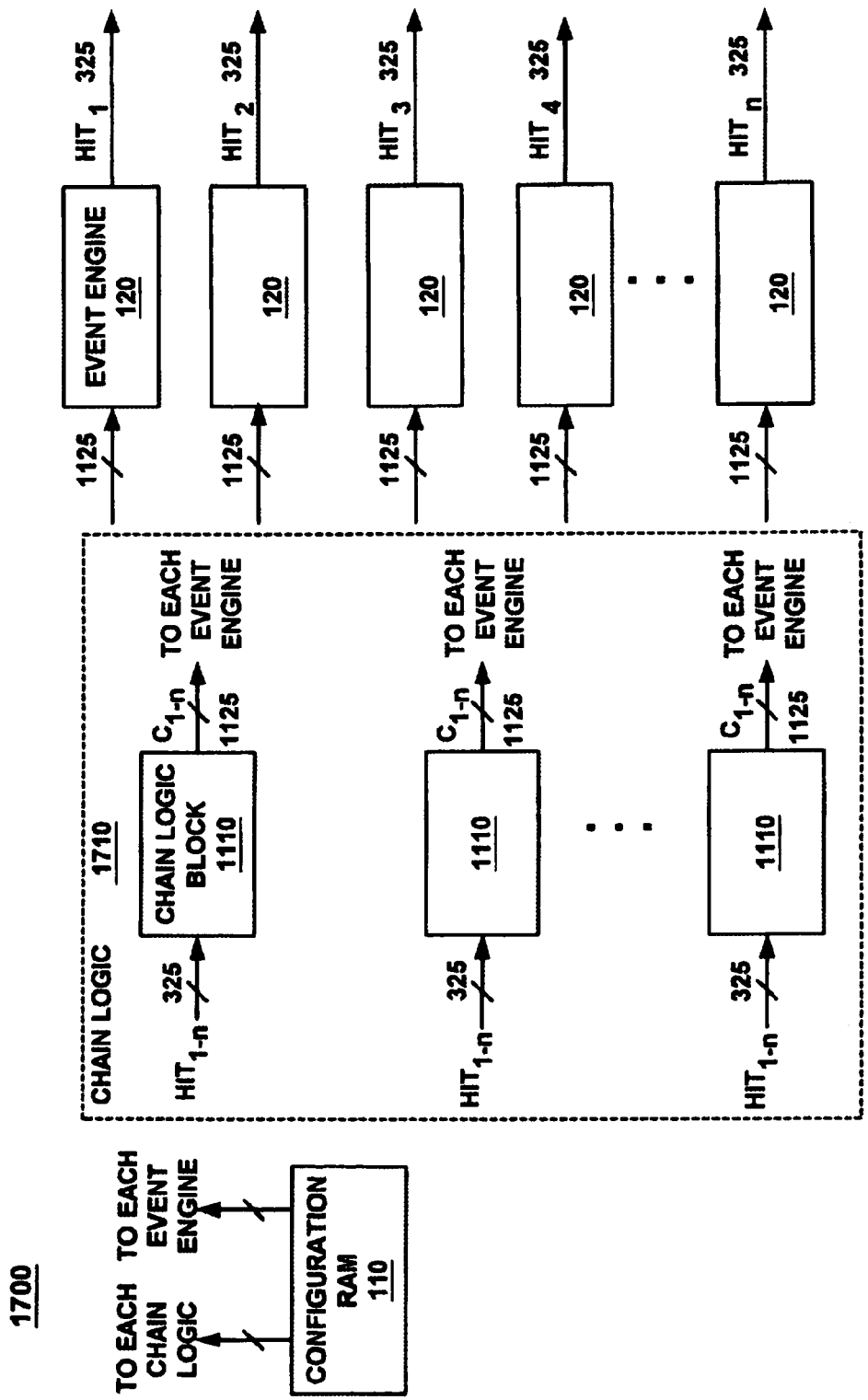
FIG. 17 is a block diagram illustrating event architecture, according to embodiments of the present invention.

Referring now to FIG. 17, an event system architecture 1700 is illustrated. The event system architecture 1700 may have a number of event engines 120, which may be for monitoring conditions and may produce hit signals 325 in response to conditions being satisfied or events being detected. The event system architecture 1700 may have a chain logic 1710 comprising a number of combinational logics or chain logic blocks 1110 that input the hit signals 325. The event system architecture 1700 may also have a configuration RAM 110 for storing data to configure the chain logic blocks 1110 such that the chain logic blocks 1110 configure the execution scheme of the event engines 120. For example, the event engines 120 may be chained in any fashion or may execute independently.

Still referring the FIG. 17, the chain logic blocks 1110 may each output a chain logic signal 1125 to each event engine 120. If a given chain logic block 1110 is not currently chaining the execution of a given event engine 120 it may output a chain logic signal 1125 of "1". In this fashion, the event engine 120 may be unaffected by the chain output signal 1125. For example, active event engines 120 may be run independently. By active event engines 120 it may be meant that a given event engine 120 is currently monitoring for a condition. Event engines 120 may be made active or inactive as described herein by setting, for example, a bit in the data block (e.g., bit 31 of FIG. 6 or FIG. 9) that may configure that event engine 120. The chain logic blocks 1110 may also configure the event engines 120 to form one or more chains of execution.

The chain logic blocks 1110 may be configured by data from the configuration RAM 110 to configure the execution scheme of the event engines 120. For example, each chain logic block 1110 may be configured to select certain hit signals 325 and form a Boolean expression with them. Each chain logic block 1110 may then output a chain logic signal 1125, which may be based on both the result of its Boolean expression and whether the event engine 120 to which the chain output signal 1125 is sent is to be chained. In this fashion, the chain output signals 1125 may chain the execution of the event engines 120.

Figure 18A:
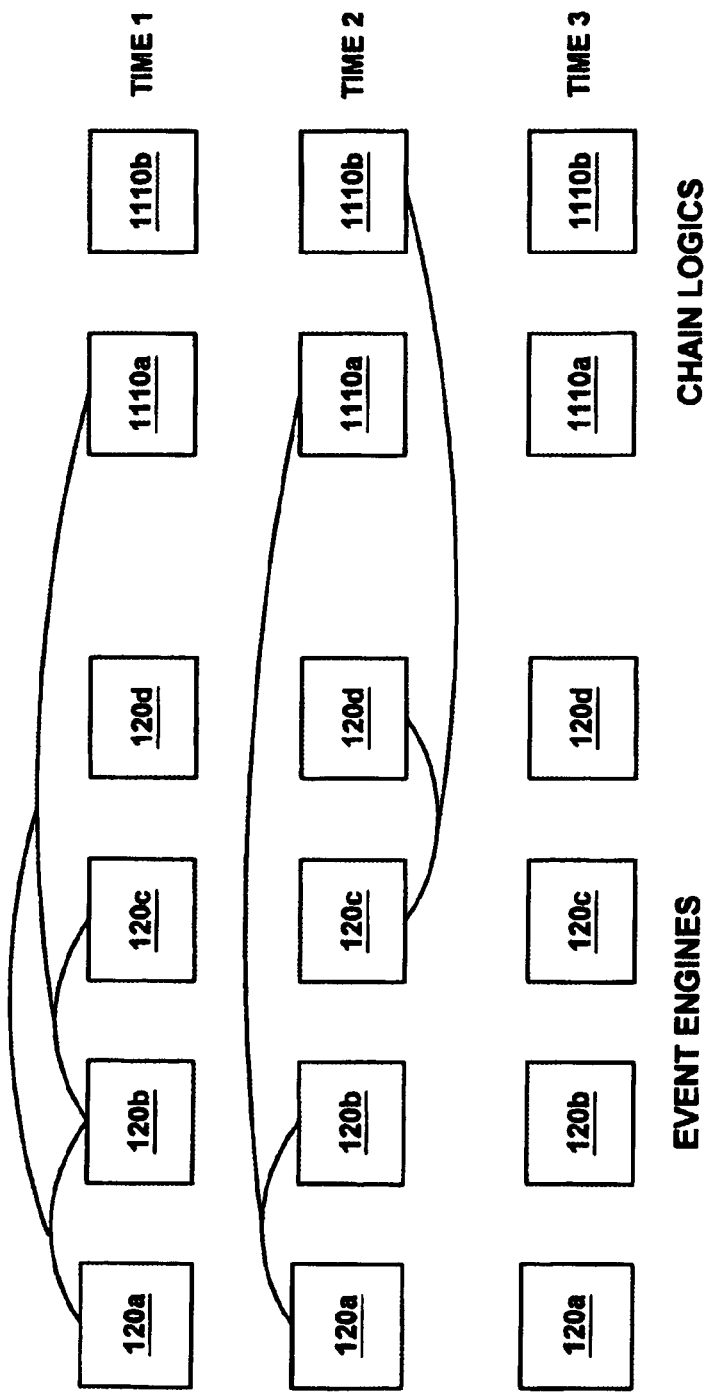
FIG. 18A is a diagram illustrating event engines chained in various execution schemes, according to embodiments of the present invention.

Embodiments that have at least one chain logic block 1110 for every two event engines 120 may configure the execution scheme of the event engines 120 in any fashion. Referring now to time 1 of FIG. 18A, the configuration may be a first chain logic block 1110a chaining a first group of event engines 120a, 120b, 120c while a second chain logic block 1110b does not chain any event engines 120. Event engine 120d may or may not be executing. Tables 1850–1870 of FIG. 18B illustrate the chain output signals 1125 that chain logic blocks 1110a and 1110b may output to event engines 120a-120d. As table 1850 shows, chain logic block 1110a may output to event engines 120a–120c the result of the Boolean expression for which it was configured to perform. It outputs a "1" to event engine 120d. Chain logic block 1110b outputs a "1" to event engines 120a–120d. In this fashion, chain logic block 1110b may have no effect on the event engines 120a–120d.

Referring again to FIG. 18A and now to time 2, the execution scheme may be the first and second chain logic blocks 1110a, 1110b chaining separate groups of event engines 120 (e.g., chain logic block 11110a chains event engines 120a and 120b, while chain logic block 1110b chains event engines 120c and 120d). Referring to table 1860 of FIG. 18B, chain logic block 1110a may output to event engines 120a and 120b a chain logic signal 1125 that may be equal to the Boolean expression (BE) it is configured to form at that time. Chain logic block 1110b may output to event engines 120c and 120d a chain logic signal 1125 that may be equal to the Boolean expression it is configured to form at that time. The chain logic blocks 1110a and 1110b output a "1" to other event engines 120 at this time.

Referring again to FIG. 18A, still another possibility is that neither the first nor the second chain logic block 1110a, 1110b chain the execution any of the event engines 120. For example, time 3 illustrates such a configuration, in which one or more of event engines 120a–120d are executing independently. Referring again to FIG. 18B, both chain logic blocks 1110a, 1110b may output chain logic signals 1125 of "1" to all event engines 120 at this time.

Another way of stating the execution scheme of the event engines 120 is that the chain logic blocks 1110 either configure the execution scheme of the event engines 120 to execute independently (e.g., as in time 3 of FIG. 18A) or the chain logic blocks 1110 configure at least two of the event engines 120 to execute together in a chain (e.g., as in times 1 and 2). When the execution scheme chains event engines 120, multitudes of possibilities exist. The states illustrated in FIG. 18A are not necessarily the states that each chain logic block 1110 and event engine 120 is presently in. Generally, not all event engines 120 and chain logic blocks 1110 will be in the same state. For example, during time 1 of FIG. 18, event engine 120d may be going through numerous states independently while event engines 120a–120c stay in their initial state until their condition is satisfied.

Embodiments of the present invention are well suited to other ratios of chain logic blocks 1110 to event engines 120 than a 1:2 ratio. Furthermore, embodiments may have many more then four event engines 120 and many more than two chain logic blocks 1110.

Figure 19:
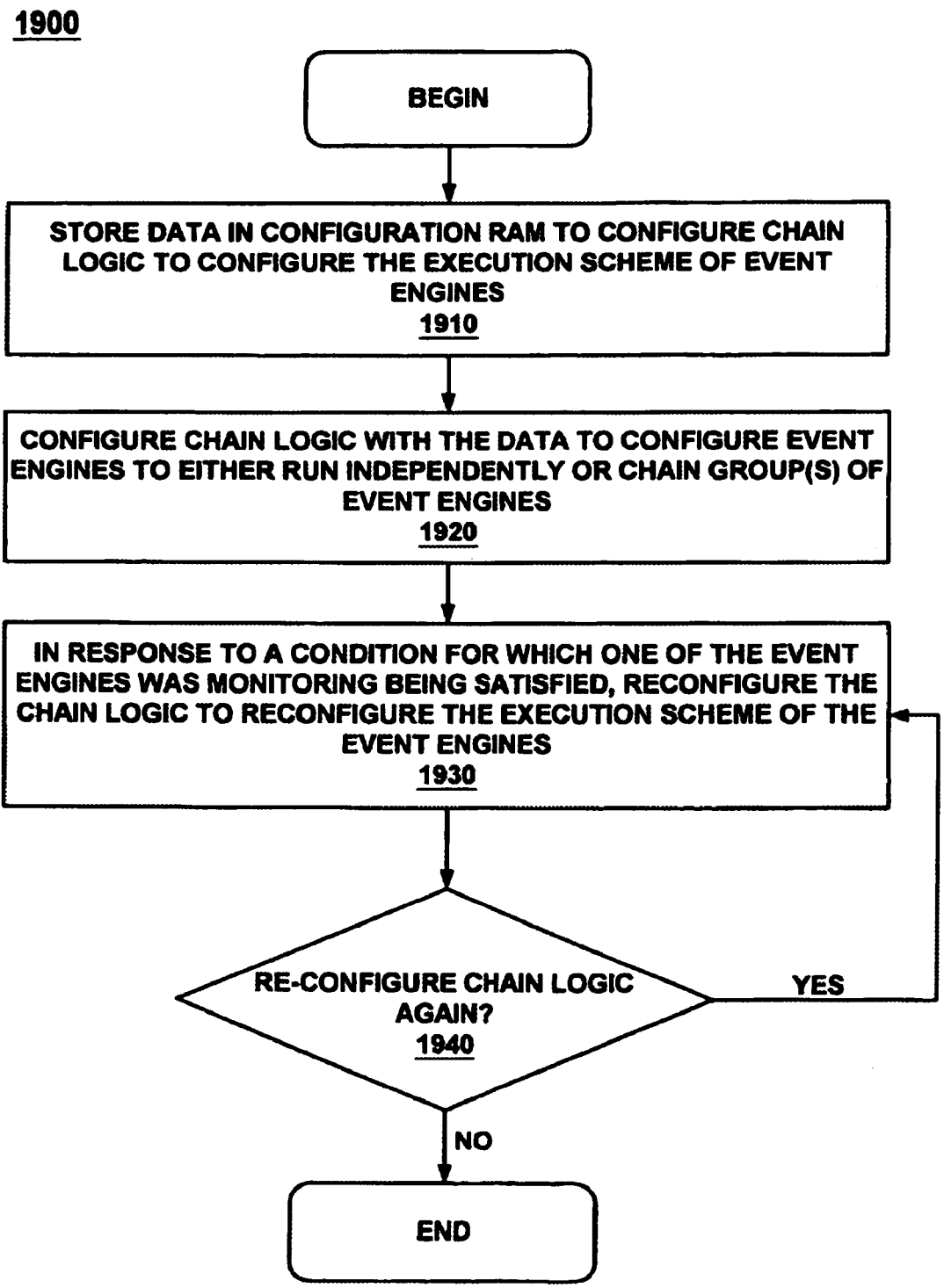
FIG. 19 is a flowchart illustrating a process of configuring event architecture, according to embodiments of the present invention.

Referring now to Process 1900 of FIG. 19, an embodiment that provides a method of configuring event architecture 1700 will be described. In step 1910, data may be stored in the configuration RAM 110. The data to configure the chain logic 1710 may be formatted as illustrated FIG. 12, for example. The configuration of the chain logic 1710 may create the execution scheme (e.g., how the event engines 210 are chained, if at all). Thus, there may be a block in the configuration RAM 110 for each chain logic block 1110 for each state for which a given chain logic block 1110 is to be configured. The configuration RAM 110 may also be loaded with data such as illustrated in FIG. 6 or FIG. 9 to configure the execution of the event engines 210. The configuration of the event engines 210 may cause the event engines 210 to monitor for various conditions.

In step 1920, the chain logic 1710 may be configured with data from the configuration RAM 110 to configure the execution scheme of the event engines 120. The event engines 120 may be configured to execute independently or event engines 120 may be grouped into one or more chains. The event engines 120 may also be configured with data from the configuration RAM 110. The event engines 120 execute according to how they are configured to monitor conditions. As they detect conditions, they may output hit signals 325 and event engines 120 that are executing independently may proceed to further states, in which case they may be re-configured by additional data (e.g., a data block shown in FIG. 6 or FIG. 9) from the configuration RAM 110. However, this will not necessarily cause the configuration of the execution scheme of the event engines 120 to be altered. For example, event engines that were executing independently may continue to execute independently and those whose execution was chained may continue to execute in chained fashion.

In step 1930, the chain logic 1710 may be re-configured to implement a new execution scheme of the event engines 120, in response to one of the event engines 120 determining that a condition for which it was monitoring being satisfied. The event engine 120 may be one that whose execution was chained to another event engine 120. The re-configured execution scheme may take a number of forms. For example, if the original execution scheme had event engines 120 executing as a first chain, the re-configuration may be that at least one event engine 120 that constituted the first chain is to execute independently. In this case, the other event engines 120 in the first chain may form another chain, stop executing, execute independently, etc. Event engines 120 from the first chain forming a new chain may do so with only members of the first chain or with event engines 120 that were not part of the first chain.

The event engines 210 themselves may be re-configured as illustrated in steps 530–550 of FIG. 5 while the chain logic 1710 remains in the same configuration (e.g., while the execution scheme remains unchanged). Process 1900 may re-configure the execution scheme of the event engines 120 any number of times and in any fashion, as reflected in step 1940 by repeating step 1930. Eventually process 1900 may end when, for example, the chain logic 1710 does not need to be re-configured any more, based on data stored in the configuration RAM 110.

Figure 20:
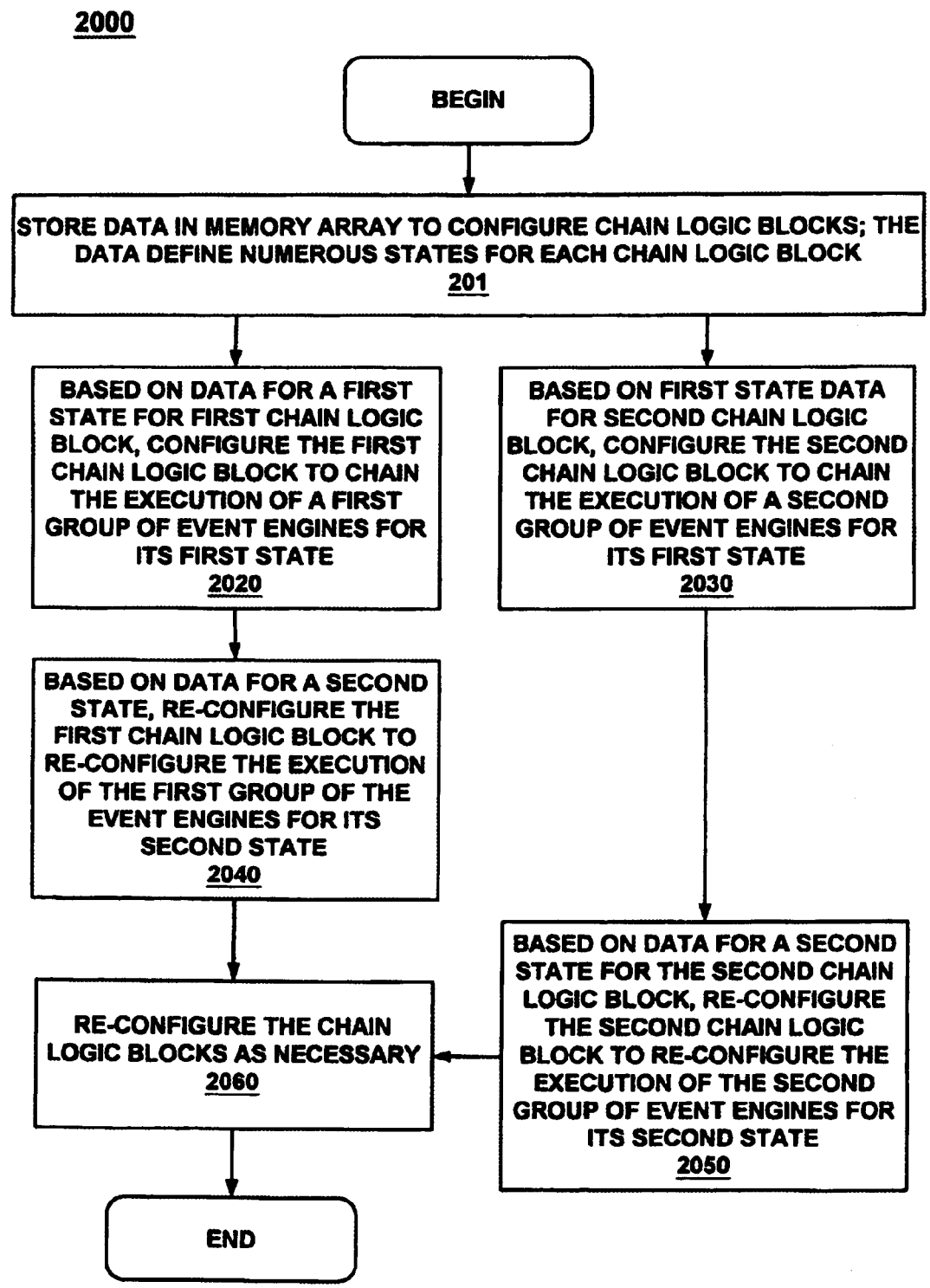
FIG. 20 is a flowchart illustrating a process of configuring event architecture, according to embodiments of the present invention.

FIG. 20 illustrates another embodiment for configuring event architecture 1700. In step 2010 of Process 2000, data may be stored in the configuration RAM 110. The data may comprise a block (e.g., as illustrated in FIG. 12) for each state for each chain logic block 1110. Not all chain logic blocks 1110 need to be used at the same time. An unused chain logic block 1110 may be configured to have no effect on the event engines 120.

In step 2020, a first chain or combinational logic 1110 may be configured to chain the execution of a first group of event engines 120 for the first state for this chain logic block 1110. The first state data for the first chain logic block 1110 may be for configuring the first chain logic block 1110 to output the result of a Boolean expression formed from input signals 325 from selected event engines 120. Therefore, step 2020 may further comprise configuring the first chain logic block 1110 to output the result of a first Boolean expression for the first state.

In step 2030, a second chain logic block 1110 may be configured to chain the execution of a second group of event engines 120 for the first state for the second chain logic block 1110. Steps 2020 and 2030 may be undertaken essentially simultaneously. The execution scheme may have other event engines 120 executing independent of the two chains described in step 2020 and 2030. Step 2030 may further comprise configuring the second chain logic block 1110 to output the result of a second Boolean expression for the first state.

Step 2030 may further comprise outputting the result of the first and second Boolean expression from the first and second combinational logics 1110 to the first and second groups of event engines 120, wherein the first group of event engines 120 are chained by the first Boolean expression and the second group of event engines 120 are chained by the second Boolean expression.

In step 2040, the first chain logic block 1110 is re-configured to, in turn, re-configure the execution scheme of the first group of the event engines 210. This may be termed a second state of the first chain logic block 1110. The reconfiguration of the first group of event engines 120 may comprise: re-configuring at least one event engine 120 of the first group to run independently, forming a third chain comprising at least one event engine 120 from the first event engines 120 and at least on event engine 120 that is not one of the first event engines 120, etc.

Step 2040 may further comprise re-configuring the first combinational logic 1110 to output the result of a third Boolean expression for its second state. Step 1940 may further comprise outputting the result of the third Boolean expression to the third group of event engines 120, wherein the third group of event engines 120 is chained by the third Boolean expression. It is also possible that multiple combinational logics 1110 are re-configured at this time. However, it is not required that more than one chain logic block 1110 be re-configured at a time. In this fashion, the chain logic blocks 1110 do not necessarily step through their states in lock-step. However, embodiments do allow for lock-step operation.

In step 2050, the second chain logic block 1110 may be re-configured to alter the execution scheme. For example it may alter the way the second group of event engines 210 are chained. This may be termed a second state of the second chain logic block 1110. The re-configuration of the second group of event engines 120 may comprise: re-configuring the second combinational logic 1110 to chain the execution of a fourth group of the event engines 210 for the second state, wherein the fourth group comprises a different set of event engines 210 than the second group; re-configuring the second combinational logic 1110 to not chain the execution of any group of the event engines 210 for the second state, wherein only the first combinational logic 1110 chains the execution of the event engines 210; re-configuring the first and second combinational logics 1110 to not chain the execution of any group of the event engines 210 for the second state, wherein the event engines 210 execute independently, etc.

Each combinational logic 1110 may be re-configured as often as desired, as represented by step 2060. When no more reconfigurations are needed, as defined by the data in the configuration RAM 110, the process 2000 may end. Process 2000 may be modified to provide for additional combinational logics 1110.

ID. External Interface to Event Architecture

Embodiments of the present invention provide external pins to a device that comprises the event architecture 1700, such that the event engines 120 may detect events external to the device. In addition, embodiments may be able to detect events that may be termed to occur within a device that houses the event architecture 1700. Furthermore, embodiments provide one or more external output pins, such that the event engines 120 may output signal(s) in response to events being detected. These events may be either internal or external to the device housing the event architecture 1700.

Figure 21:
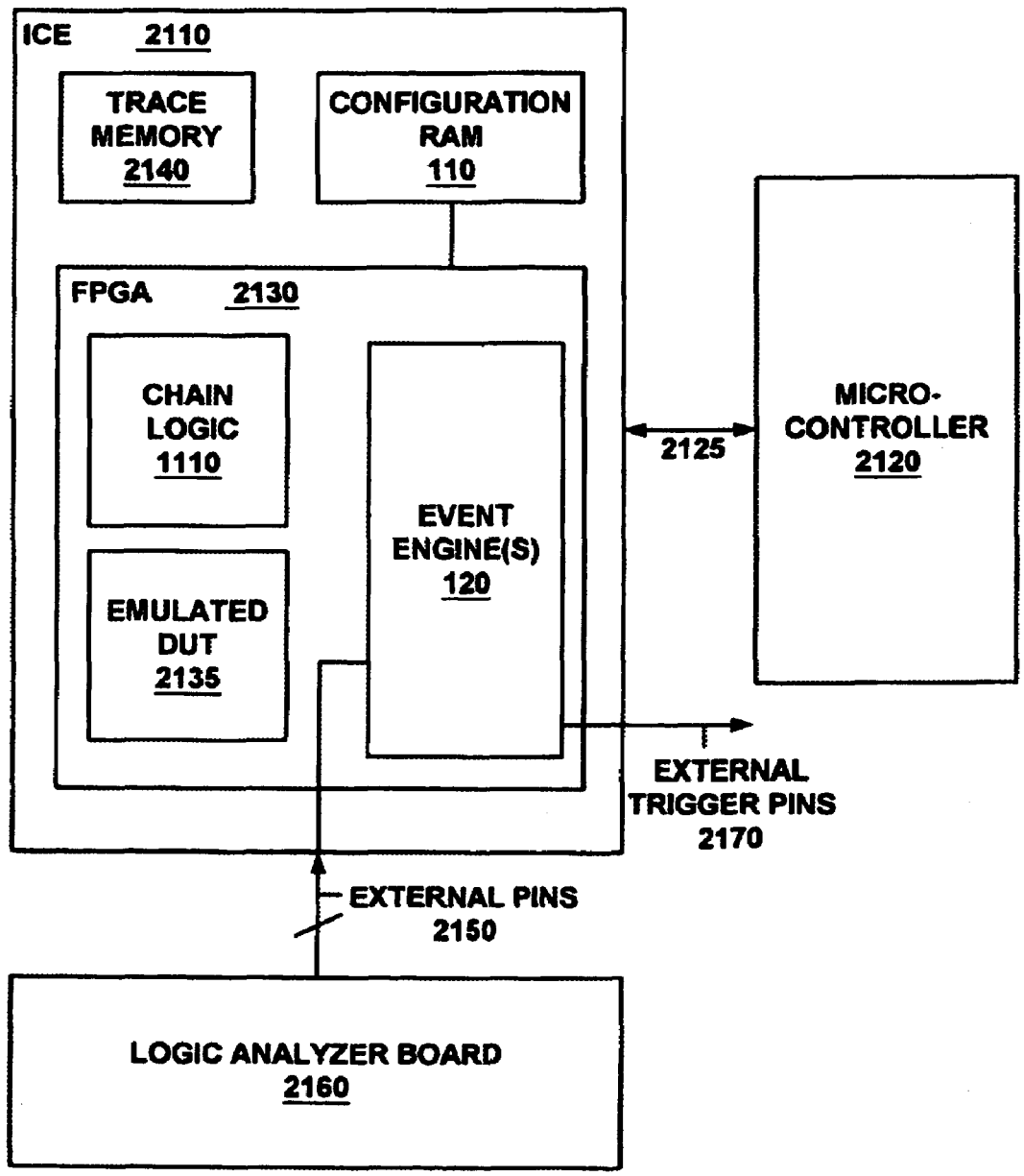
FIG. 21 is a block diagram illustrating an in-circuit emulator coupled to other devices, according to embodiments of the present invention.
Figure 22:
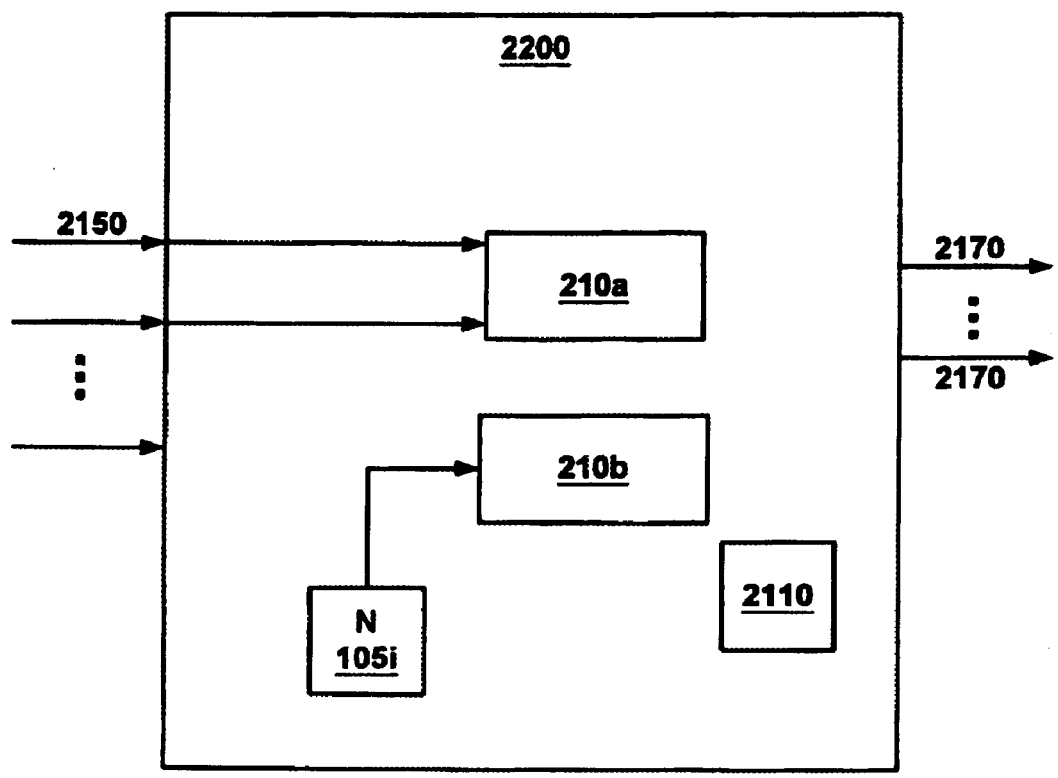
FIG. 22 is a block diagram illustrating a device having event engines, external input pins, and external output pins, according to embodiments of the present invention.
Figure 23:
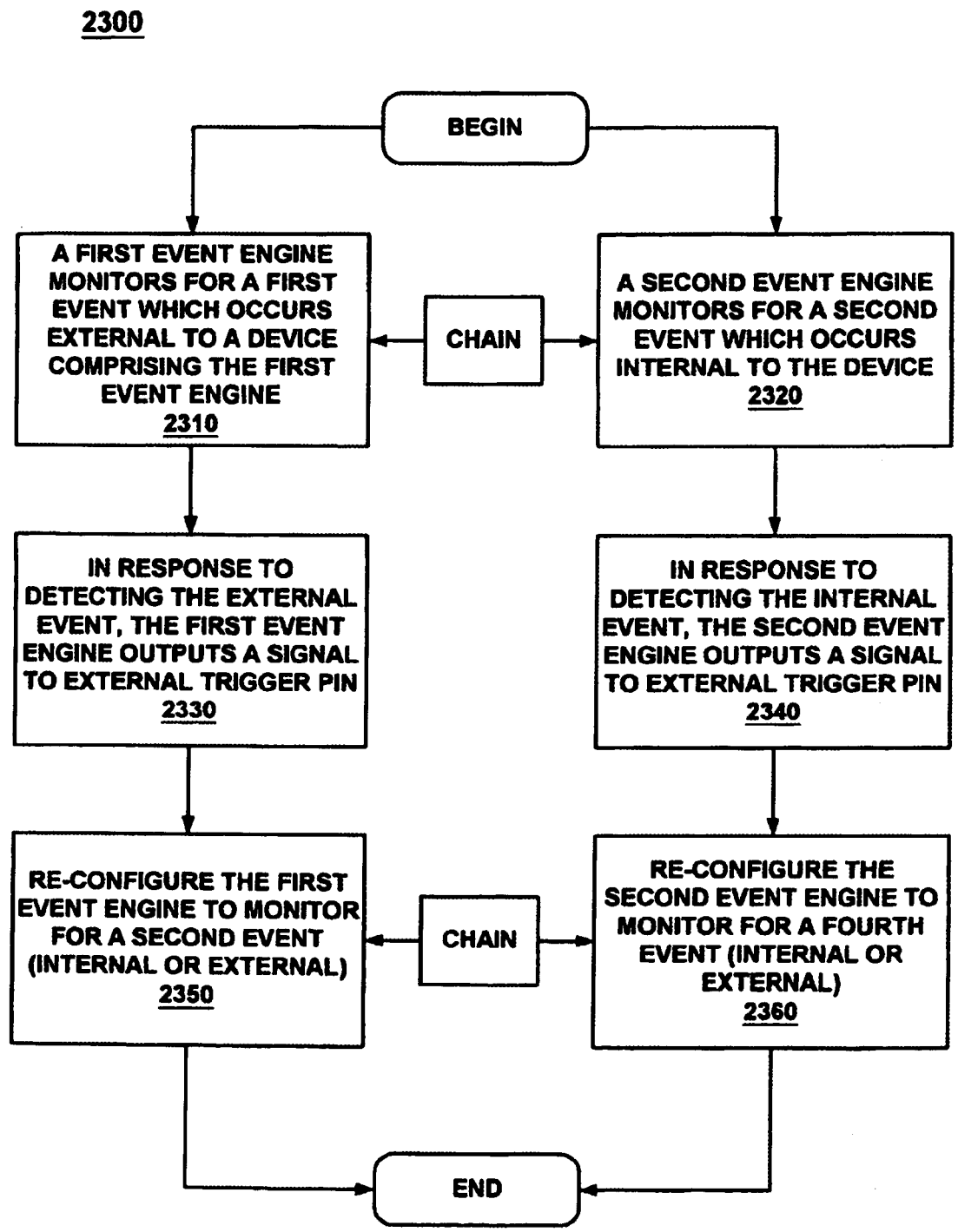
FIG. 23 is a flowchart illustrating steps of a process of monitoring events, according to embodiments of the present invention.

FIG. 21 illustrates an embodiment in which the event architecture 1700 resides in an in-circuit emulator (ICE) 2110. The system 2100 of FIG. 21 comprises an ICE 2110, which may be able to emulate a device under test. For example, the ICE 2110 may emulate a micro-controller 2120, with which it may interface via interface 2125. However, the present invention is not limited to emulating micro-controllers. The ICE 2110 may implement the emulation of the device under test in the Field Programmable Gate Array (FPGA) 2130; however, the present invention is not limited to emulating the device under test in an FPGA 2130. The Verilog™ description language may be used to facilitate the implementation.

The FPGA 2130 may emulate core processor functionality of the micro-controller 2120, such as, for example, microprocessor functions, Arithmetic Logic Unit functions, and RAM and ROM functions. However, the present invention is not limited to emulating core processor functions. The emulated device under test (DUT) 2135 may operate substantially analogously to the micro-controller 2120 or other DUT. Emulating the micro-controller in the ICE 2120 may provide significant advantages, such as, for example, providing debugging tools, such as, for example, readout of registers and memory locations. Thus, the amount of debugging support that is built into the device under test (e.g., micro-controller 2120) may be minimized. However, information may be passed between the ICE 2110 and the micro-controller 2120 via interface 2125, for example, I/O read information, interrupt vectors, etc. may be passed over interface 2125 to the ICE 2110.

A device that provides an in-circuit emulator is described in co-pending U.S. patent application Ser. No. 09/975,030, filed Oct. 10, 2001, entitled "EMULATOR CHIP/BOPARD ARCHITECTURE AND INTERFACE," by Snyder et al., and assigned to the assignee of the present invention, which is hereby incorporated by reference.

The FPGA 2130 may also comprise portions of the event architecture 1700. For example, the chain logic 1110 and the event engines 120 may reside in the FPGA 2130. The configuration RAM 110, which may also form a portion of the event architecture 1700, may reside in the ICE 2110 and be coupled to the FPGA 2130. The ICE 2110 may further comprise trace memory 2140, which may store information when the trace is on.

Still referring to FIG. 21, the ICE 2110 may have a number of external pins 2150 that may allow it to receive signals from an external device. The external pins 2150 may couple to the event engines 120 such that external events may be monitored. For example, in FIG. 21, the external pins 2150 are coupled to a logic analyzer board 2160. Thus, in one embodiment, the external pins 2150 may function analogously to logic channels on a logic analyzer. However, unlike a conventional logic analyzer, embodiments of the present invention may react on a state-by-state basis to external events and change the configuration of the event engines 120 not only to look for different events on the external pins 2150, but also to look for different events that occur inside the ICE 2110.

In one embodiment, the signals on the external logic pins 2150 are automatically fed into the trace memory 2140 of the ICE 2110. Therefore, the state of events external to the ICE 2110 may be correlated to the state of events inside the ICE 2110. For example, the state of a device or circuit outside the ICE 2110 may be correlated to a portion of the code running when external events trigger.

Still referring to FIG. 21, the ICE 2110 may also include an external trigger pin 2170, which may be fed the output signal 115a from the external trigger logic 820 shown in FIG. 7. The ICE 2110 may have multiple external trigger pins 2170. Thus, one or more external devices may be controlled in response to the detection of events being monitored. For example, an event engine 120 may monitor for the program counter being in a certain range, and in response to the detection of that event, outputting a signal 115a, which may trigger an oscilloscope to capture data related to a circuit or device under test. While the external interface pins 2150, 2170 have been described as input or output pins, it will be clear to those of ordinary skill in the art that a pin may serve as both input and output.

By being able to monitor both internal events and external events, as well as being able to emulate a device under test and control devices with external trigger signal(s), embodiments of the present invention are able to provide the functionality of both an ICE 2110 and a logic analyzer. However, the example illustrated in FIG. 21, in which the device comprising event architecture 1700 with external interfaces is an ICE 2110, is not limiting. Embodiments of the present invention are well suited to other devices with external interfaces hosting the event architecture 1700. Furthermore, coupling the external pins 2150 to a logic analyzer board 2160 is not limiting; embodiments of the present invention are well suited to receiving signals from other devices via the external pins 2150.

Referring again to the embodiment illustrated in FIG. 4, the multiplexer 410 receives a number of signals 105, some of which may originate from within the device that houses the event architecture 1700 (e.g., the program counter, accumulator, etc.). However, the multiplexer 410 may also receive signals 105 that originate from outside the device that houses the event architecture 1700. For example, external logic pin signals 415 may originate from outside the device and may be received by the physical external pins 2150. Furthermore, some signals 105 may originate from the device under test, such as the micro-controller 2120. For example, I/O signals may originate from the micro-controller 2120, although the present invention is not so limited. As discussed herein, the multiplexer 410 may be used to select which signals 105 are to be monitored for the occurrence of events or for conditions being satisfied.

As discussed herein, the device housing the event architecture 1700 may have any number of external interface pins 2150, 2170 and may monitor both internal and external events. By internal events, it may be meant that the events are related to the operation of the emulated DUT 2135 in the FPGA 2310. By external events it may be meant that the events relate to information received on external interface pins 2150. However, the present invention is not limited to monitoring only such events. For example, the ICE 2110 may receive information from the device under test (e.g., micro-controller 2120) via interface 2125. The block diagram of FIG. 22 and the Process 2300 of FIG. 23 will now be discussed. In step 2310, a first event engine 210a monitors for a first event that occurs external to a device 2200 comprising the first event engine 210a. The event engine 210a may select one or more external logic pins 2150 as discussed herein.

In step 2320, a second event engine 210b monitors for a second event that occurs internal to the device 2200, which also comprises the second event engine 210b. In so doing, the second event engine 210b may select a signal 115, such as, for example, the value of the program counter (see, e.g., FIG. 4, FIG. 6, FIG. 9 and their associated descriptions). The second event engine may also receive the information relating to the program counter from the micro-controller 2120 via the interface 2125. The execution of the first and second event engines 210a, 210b may be chained by one or more chain logic blocks 1110 as discussed herein; however, they may also execute independently.

The device housing the event engines 210 may also be performing emulation. For example, the ICE 2110 may be emulating a device under test. In this case, the signal 105 that is input to the event engine 210 may be a signal 105 related to the emulated DUT 2135. However, the signal 105 may also originate from an actual DUT, for example micro-controller 2120.

In step 2330, the first event engine 210a may output a trigger signal(s) 115a on one or more of the external trigger pins 2170, in response to the external event for which it was monitoring being detected.

In optional step 2340, the second event engine 210b may output a trigger signal(s) 115a on one or more of the external trigger pins 2170, in response to the internal event for which it was monitoring being detected. Thus, trigger signals 115a may be issued based on internal or external events. Also, the device 2200 housing the event architecture may have any number of external trigger pins 2170.

In step 2350, the first event engine 210a may be re-configured to monitor for a third event, which may be an internal or an external event. Thus, the first event engine 210a may input any of the internal signals 105i or any of the signals from the external logic pins 2150.

In step 2360, the second event engine 210a may be re-configured to monitor for a fourth event, which may be an internal or an external event. Thus, the second event engine 210b may input any of the internal signals 105i or any of the signals from the external logic pins 2150. Process 2300 may then end. Additional steps may be inserted in Process 2300 such as, for example, steps for monitoring for additional events, etc.

Process 2300 may be modified to execute only selected steps thereof, such as, for example, not performing step 2310 of monitoring for external events. Thus, embodiments provide for a process in which an event engine 210 outputs an signal 115a on an external trigger pin 2170, in response to internal events only, as illustrated in steps 2320 and 2340.

Section II

Figure 24:
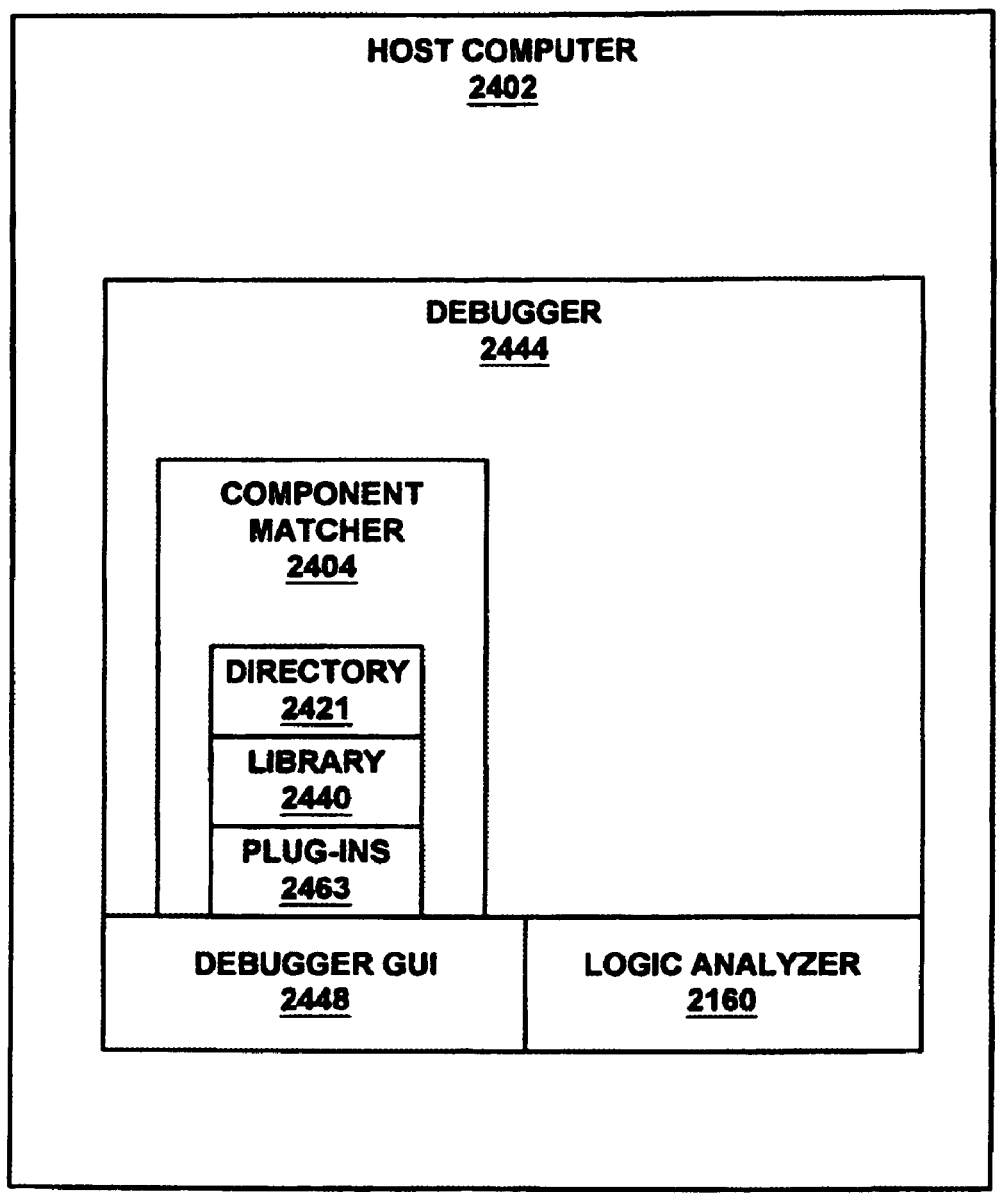
FIG. 24 is a block diagram of an exemplary host computer system upon which embodiments of the present invention may be deployed.

Graphical User Interface for Programming Threads, States, and Chain Logic for Combining Threads, and for Selecting Combinatorial Logic Processes for Two or More Threads Exemplary Distributed Architecture With reference to FIG. 24, a host computer 2402 serves as a platform for debugger software 2444 and logic analyzer 2160 in one embodiment of the present invention. In the present embodiment, a graphical user interface (GUI) 2448 is deployed to function with debugger 2444 and logic analyzer 2160. GUI 2448 provides a method to program the states and the threads of the event engine (e.g., threads 200a, 200b; FIG. 10 and event engine 120; FIGS. 1, 3, 21, 25). In another embodiment, GUI 2448 may be separate from, yet co-functional and interactive with debugger 2444 and/or logic analyzer 2160.

In an alternate embodiment, GUI 2448 may be constituted by an assortment of separately selectable GUI functionalities. In the alternative embodiment, a component matcher 2404 has a directory 2421. Upon identifying a microcontroller 2120 (FIGS. 21, 25) as a particular device having certain characteristics denoted by a unique identifier, its identifier can then be stored in directory 2421. Upon identifying microcontroller 2120 as a particular type of device, component matcher 2404 consults a library of codes 2440 by which FPGA 2130 of ICE 2110 (FIG. 21) may be programmed accordingly to effectively and properly interact with that particular device.

Component matcher 2404 will also select a plug-in from an array 2463 of plug-ins based on the version identification code. The plug-in selected corresponds to the proper plug-in to allow interaction of the debugger 2444 software with the particular device 2120 identified. Such interaction between the debugger 2444 and microcontroller 2120 may be further facilitated by selecting a graphical user interface (GUI) from the assortment 2448 of separately selectable GUI functionalities available. The proper GUI is the one that will facilitate the best interface between a user of debugger 2444 with microcontroller 2120.

Figure 25:
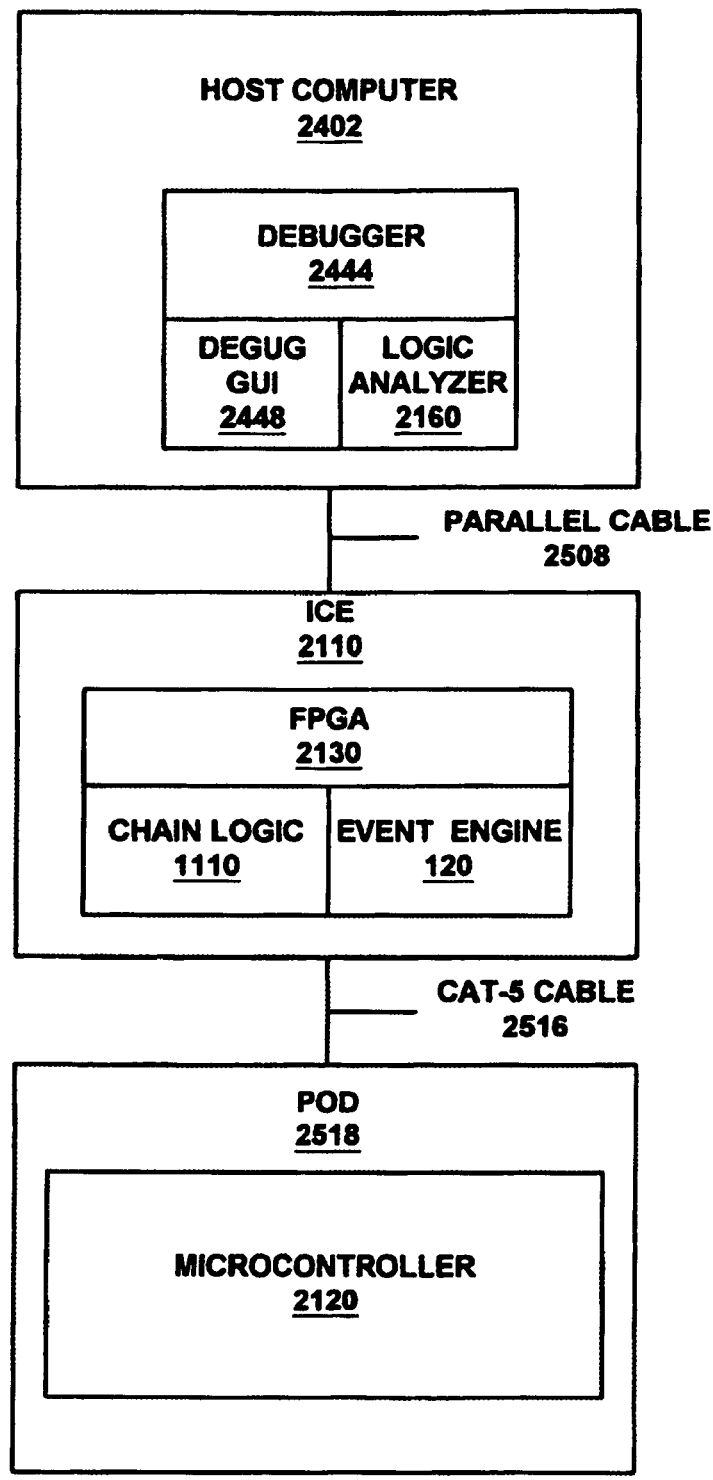
FIG. 25 is a diagram of an exemplary distributed debug architecture upon which embodiments of the present invention may be deployed.

With reference to FIG. 25, a system 2500 deploys debugger 2444 with GUI 2448 and logic analyzer 2160, according to an embodiment of the present invention. Host computer 2402 is any type of computer system capable of functioning as a platform for the software constituting a debugger 2444, GUI 2448, and logic analyzer 2160. For example, host computer may be a PC, with a high capacity RAM and disc storage, and powerful processors, deploying a Windows™ application, upon which debugger 2444, GUI 2448, and logic analyzer 2160 may function.

A cable 2508 couples host computer 2402 to ICE 2110. ICE 2110 in one embodiment contains FPGA 2110, which may be programmed in response to code promulgated by the debugger 2444. FPGA 2130 may also deploy programmable chain logic 1110 and programmable event engine 120. The event engine 120 can be programmed to realize events and breakpoints that are based on complex and programmable expressions. These can be used for debugging microcontroller 2120. Further, ICE 2110 may deploy RAM 110 to configure these and other constituents of FPGA 2130, as explained above (e.g., FIG. 21). ICE 210 has a data storage capacity of 128 Kbytes in one embodiment and is of limited computational power, relative to the host computer 202.

The circuit under test in the present environment is a microcontroller or other IC 2120 inserted into a pod 2518, connected to ICE 210 by a cable 2516, capable of transferring data at a rate of 100 Mbps or greater. Pod 2518 mounts a device for testing and other purposes. The microcontroller 2120 supportable by pod 2518 may be of a single, unique design. Alternatively, microcontroller 10 may exemplify more than a single device, and pod 2518 may be capable of supporting various device pin-outs. In the alternative embodiment, the devices exemplified by microcontroller 2120 may be similar, in particular, how they connect and communicate through pod 2518 with the rest of system 200.

Pod 2518 and the device it mounts has the capability to communicate with ICE 2110 and exchange information therewith. ICE 2110 according to embodiments of the present invention has the capability to recognize pod 2518 and any device deployed thereon, exemplified herein by microcontroller 2120. This recognition may be effectuated by a unique identifier of microcontroller 2120. Upon interconnecting ICE 2110 and pod 2518 deploying microcontroller 2120, ICE 2110 automatically reads the unique identifier of pod 2518 and/or of microcontroller 2120 and relays that information back to the debugger 2444.

The exemplary architecture of system 2500 constitutes three different components, operating with different computational characteristics, including but are not limited to processing power and memory, and even internal structure and function. System 2500 effectuates debugging operations in a low cost, flexible, distributed architecture. It is appreciated that in another embodiment, system 2500 may be constituted by components different from those described herein, which are exemplary and one effective functional architecture, but in no way meant to express or imply exclusive applicability. Furthermore, system 2500 is effectively adaptable to the limited supervisory capabilities of relatively lower level IC computing devices (e.g., chip), exemplified by microcontroller 2120. Advantageously, this adaptability allows changing supervisory capabilities handled by the chip, without necessitating modification of much if any of the higher level capabilities of debugger 2444.

In the present embodiment, neither ICE 2110 nor its FPGA 2130 are limited to functioning with a single type of pod or device thereon. On the contrary, ICE 2110 is fully capable of supporting any type of pod exemplified herein by pod 2518 and/or any type of device mounted on pod 2518, as exemplified herein by microcontroller 2120. This accords great flexibility to system 2500. This flexibility is especially advantageous vis-á-vis conventional debugging systems, wherein each different pod and/or device mounted thereon requires a unique ICE. The flexibility accorded by one present embodiment may accrue to functionalities with and/or within debugger 2444, including, but not limited to debugger GUI 2448 and logic analyzer 2160. ICE 2110 and pod 2518 execute program instructions in lock-step fashion. Host computer 2402 accesses ICE 2110 to determine the internal state of device 2120 reflected therein, during debugging operations.

FPGA 2130 is re-programmed every time the debugging software 2444 is run with ICE 2110, to program the ICE 2110 to do something, e.g., debugger 2444 downloads into FPGA 2130 a bitstream. This download is based on the microcontroller's version identification. This bitstream carries a logic set containing everything FPGA 2130 needs to configure its logic to perform useful functions with pod 2518 and microcontroller 2120. First, whatever function the microcontroller 2120 connected to pod 2518 performs will be mirrored by the bitstream downloaded by debugger 2444 to FPGA 2130 in ICE 2110. In this fashion, microcontroller 2120 and ICE 2110 operate in lock-step during debugging operations. Second, debug features are loaded into ICE 2110 that support the features of microcontroller 2120.

Thus, to support the particular features of specific microcontrollers at the software level in debugger 2444, user code is supportable and whatever functionality ICE 2110 possesses should be matched. For instance, if ICE 2110 is to have some particular debugging feature for a particular microcontroller 2120, then the software of debugger 2444 needs to support it. In the present embodiment, this support includes providing a sufficient GUI 2448. The host computer 2402 downloads the required data to allow the ICE 2110 to properly co-operate with device 2120. Plug-in modules 2463 (FIG. 24) match the needs of particular devices 2120 and the host computer 2402. It is appreciated that software plug-in modules 2463 may be distributed in more than one section of debugger 2444. However, they may also be viewed functionally as a single array.

Thus, three components, the pod 2518, the ICE 2110, and the debugger 2444 (in one embodiment via component matcher 2404; FIG. 24) are matched automatically when the host application connects to pod 2518 and determines the type of pod that is attached at that instant.

Exemplary Unifying Function for GUI

Debugger event GUI 2448 provides, in one embodiment, a user interface window that allows the selection of a unifying function (e.g., functions as a unificator) which ties together separate threads and the window also establishes a logic that determines an action to be taken and when that action is to be executed. Such actions may include, but are not limited to, executing a break, turning traces on and off, and setting an external trigger. Different threads that are running may be unified by GUI 2448. Upon satisfaction of the conditions of the various running threads, GUI 2448 applies combinatorial logic (e.g., combinational logic 1110; FIGS. 11A, 21), in one embodiment in ICE 2110, to determine which event to trigger or to determine which state to enter next. Functioning as a unificator, GUI 2448 performs various standard logical operations (e.g., AND, OR, NOR, NAND) upon the results of the different threads.

Each thread has a number of parameters that it sets up, whether triggered or not. One characteristic of the unificator is the provision of combinational logic and event selection that unifies the different threads that may or may not have their conditions satisfied. In one embodiment, the unificator unifies two threads of a state. In another embodiment, the unificator unifies any number of threads. GUI 2448 graphically displays to a user (e.g., on a monitor screen) the threads, the state logic, events, and selections. Further, GUI 2448 provides to the user a number of graphical interface options. The information and interface mechanisms are graphically deployed, in one embodiment, as a Windows™ application. These are discussed below with reference to a series exemplary user interface screen shots.

Figure 26:
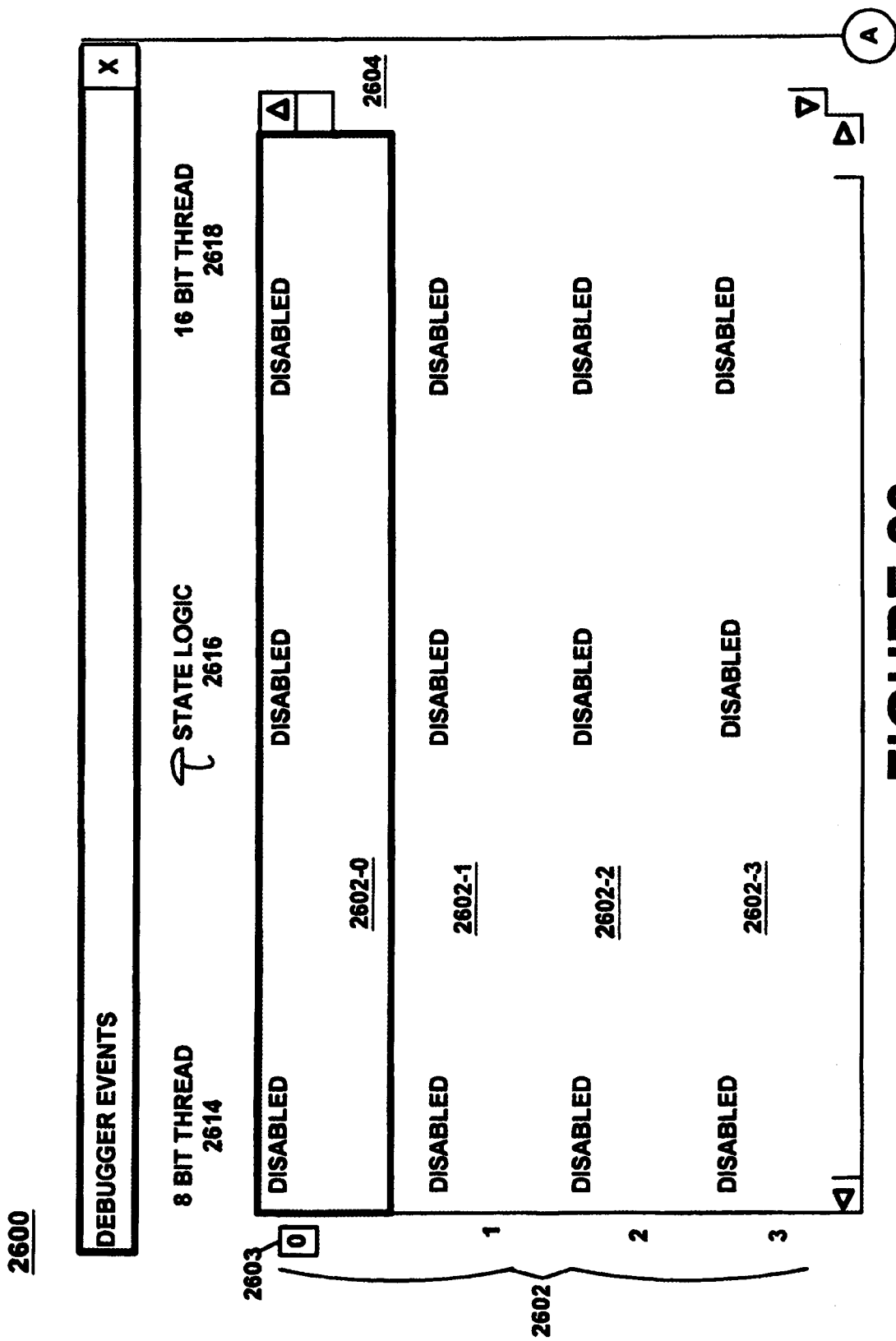
FIG. 26 is a screen shot of an exemplary GUI window arrangement, depicting an initial state in which nothing has yet been programmed, in accordance with an embodiment of the present invention.
Figure 26:
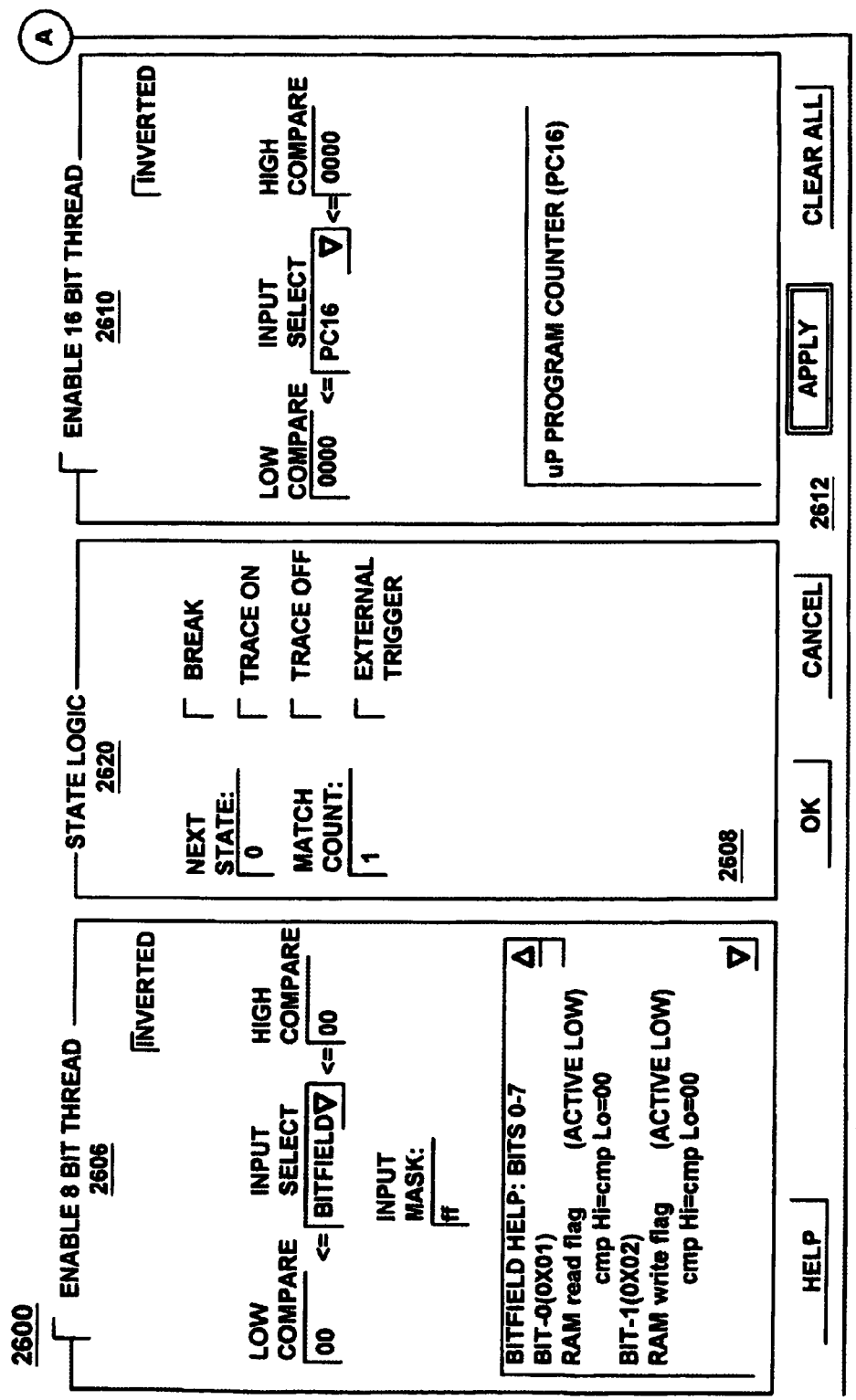

With reference to FIG. 26, a screen shot of an initial window 2600 is depicted. Window 2600 displays a condition in which no event information is programmed. There are no conditions set for any of the threads. Thus, there are no conditions specified to be satisfied, and there is nothing depicted to unify. Screen shot 2600 may be thought of as depicting one possible initial condition, which a user of debugging tool 2444 (FIG. 24) may encounter upon initiating GUI 2448.

A field window 2602 displays a series of event subfields 2602-0 through 2602-3 or "states", which may be numbered sequentially by displayed numerals 2603. It is appreciated that whatever number of event subfields may be displayed in field window 2602 at any given time may be less than the total number of events and corresponding subfields GUI 2448 is capable of handling. Some fields may be kept hidden until a user calls for them. An up/down scrolling control 2604 enables a user to scroll to the other event subfields.

Headers 2614, 2618, and 2616 designate vertical areas of field window 2602 corresponding to state information displayed for two threads and state logic selected, respectively. Therefore, each numbered state can have at least two threads defined for it, as well as specific state logic. As described below, state logic may indicate how threads are combined in an expression and the action to be taken when a thread or a thread expression is satisfied. A particular event subfield or "state" may be activated for interfacing by actively designating the field. This may be accomplished by placing a cursor or similar marker in that field and triggering a designating mechanism such as "clicking" with a mouse, applying a designating keyboard input, or some similar mechanism, and highlighting that subfield. In the present example, subfield 2602-0, as well as its corresponding state numerator '0' of displayed numerals 2603, is visually highlighted, indicating that it is selected. Each vertical area corresponding to headers 2614, 2616, and 2618 display 'Disabled.' This indicates that nothing is selected in the condition displayed and selected by GUI 2448 in this screen shot.

Field windows 2606 and 2610 allow the user to select and program threads (e.g., threads 200a, 200b; FIG. 10) to be enabled and to input parameters for those particular threads. It is appreciated that in another embodiment, any number of threads may be enabled per state. In the present embodiment, field window 2606 enables 8-bit threads and field window 2610 enables 16-bit threads. The threads to which windows 2606 and 2610 perform are those of the currently highlighted state, e.g., 2602-0. Field windows 2606 and 2610 summarize the parameters for 8-bit and 16-bit threads, respectively. These fields allow a user to read and/or set, as by drop-down menus for example, comparison values, what is being compared, and the nature of the input mask. Users of GUI 2448 may thus graphically guide their way through setting up value comparisons for the threads.

Figure 28:
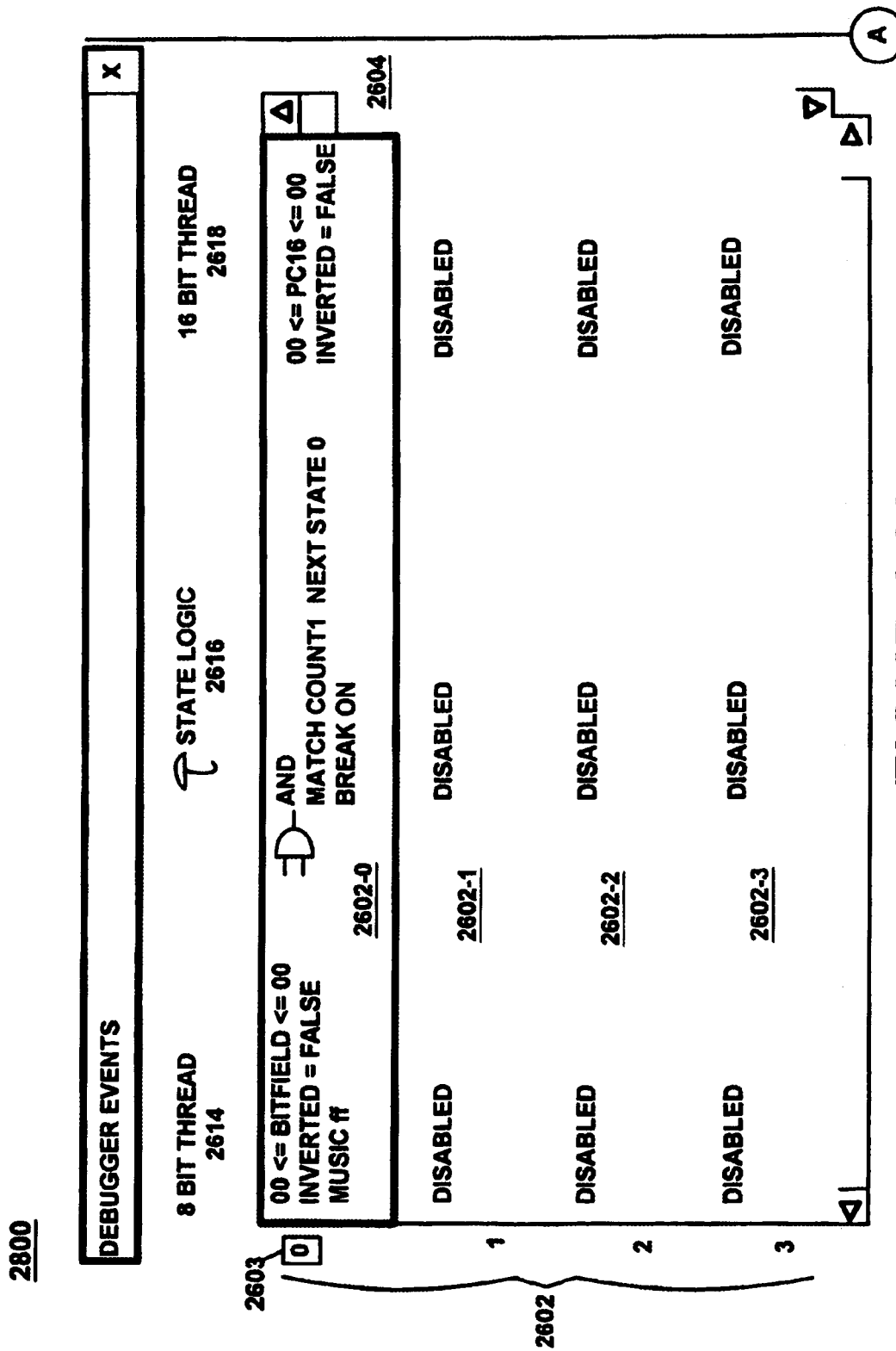
FIG. 28 is a screen shot of an exemplary GUI window arrangement, depicting the programming of multiple threads with a single state, in accordance with an embodiment of the present invention.
Figure 28:
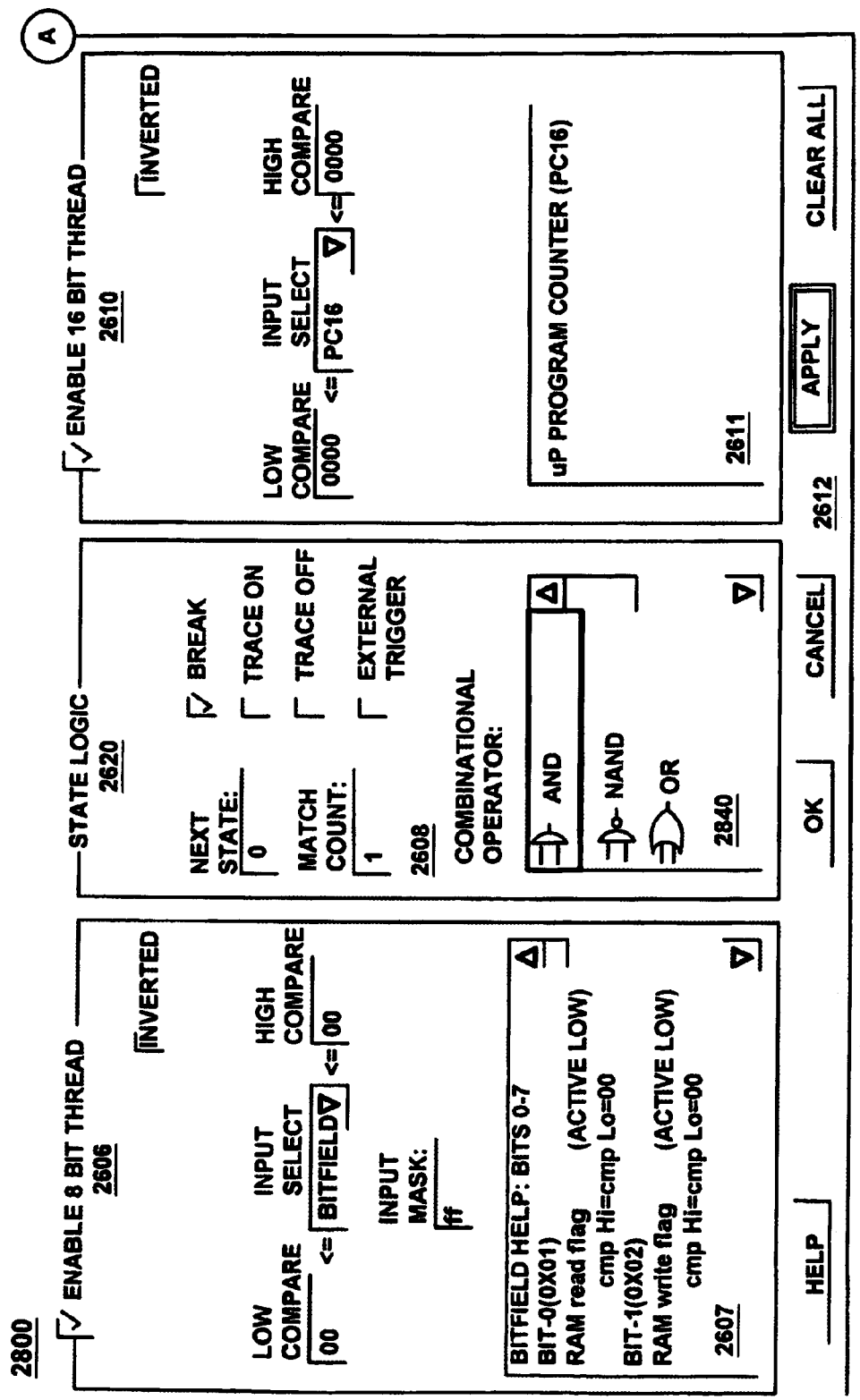
Figure 29:
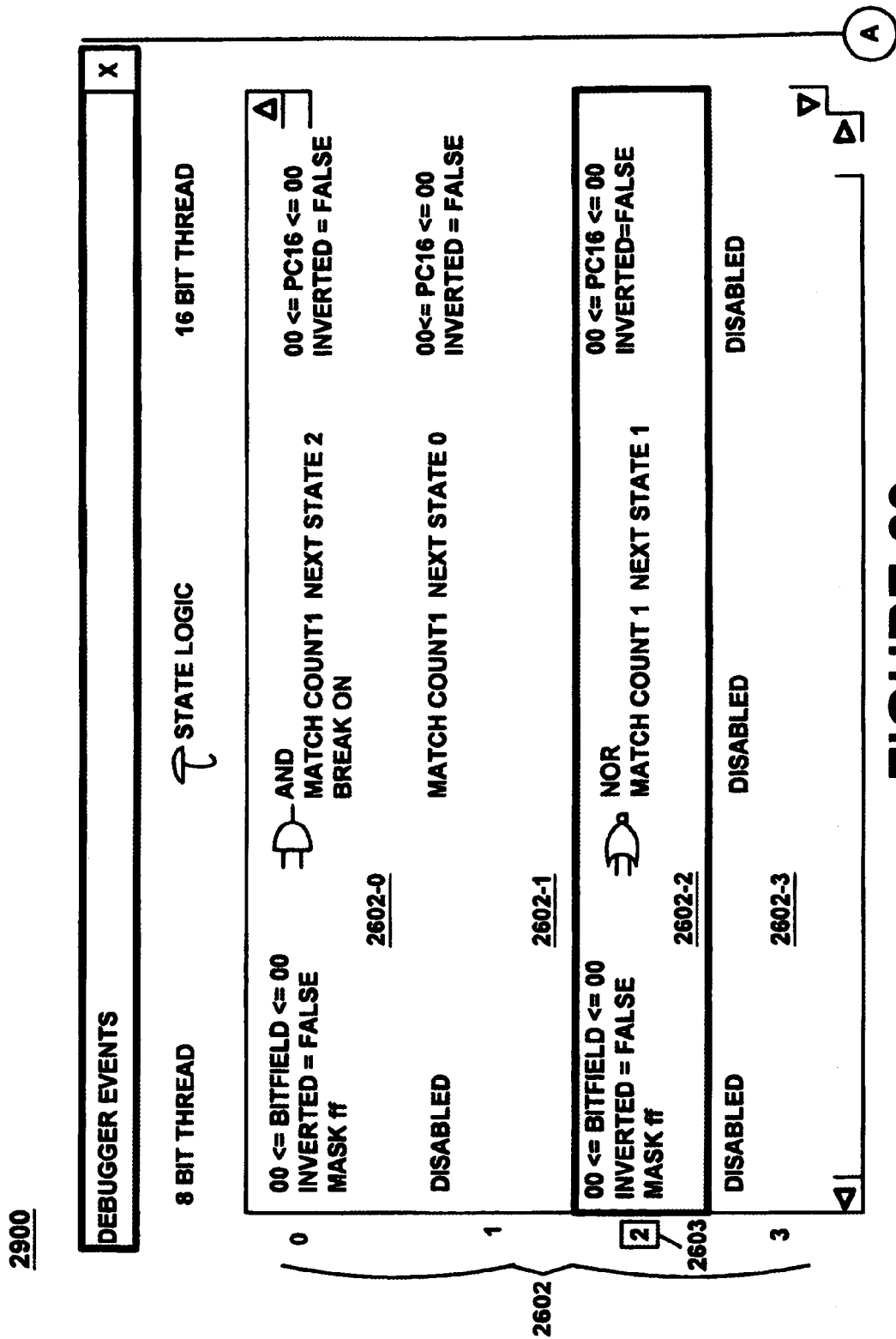
FIG. 29 is a screen shot of an exemplary GUI window arrangement, depicting the programming of multiple states with multiple threads, in accordance with an embodiment of the present invention.
Figure 29:
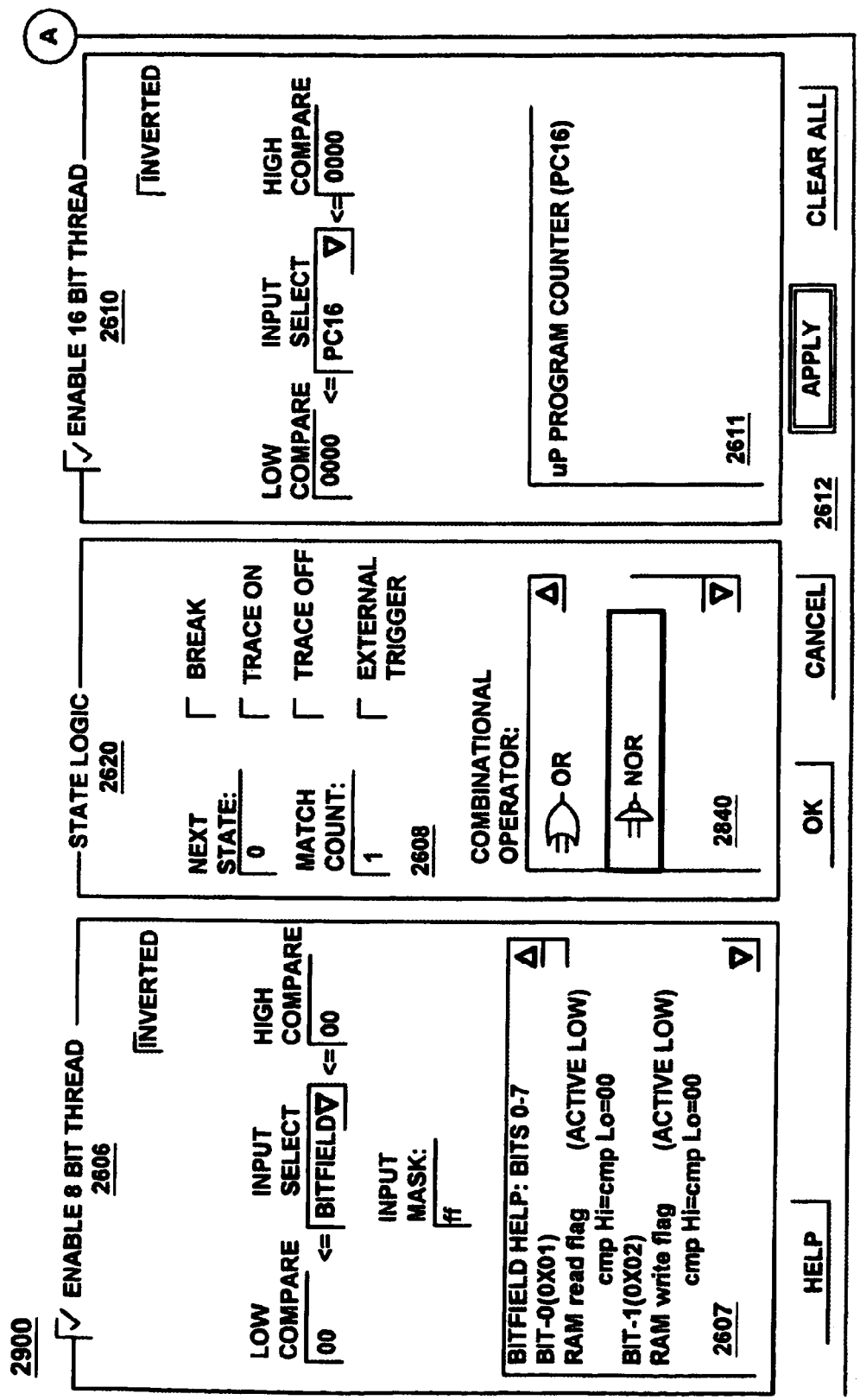

Field window 2608 displays state logic parameters and allows settings thereto. Generally, the field window 2608 corresponds to the highlighted state and provides tools to the user to combine the threads of the state into a single expression and to indicate an action to be taken when a thread or a threaded expression is satisfied, e.g., the next state to enter, etc. Actions taken include the next state, the match count, and selectors 2620. Selectors 2620 allow a user to set the execution of a break, turn traces on and off, and select an external trigger. A unification window (e.g., unificator window 2840; FIGS. 28, 29) may also be displayed in state logic window 2608. An button bar 2612 displays an array of on-screen "clickable" buttons with which a user may also interface using GUI 2448. Each clickable button initiates a different user action, such as "Apply,' 'Cancel,' 'Help,' 'OK,'°'Clear All,' etc.

Figure 27:
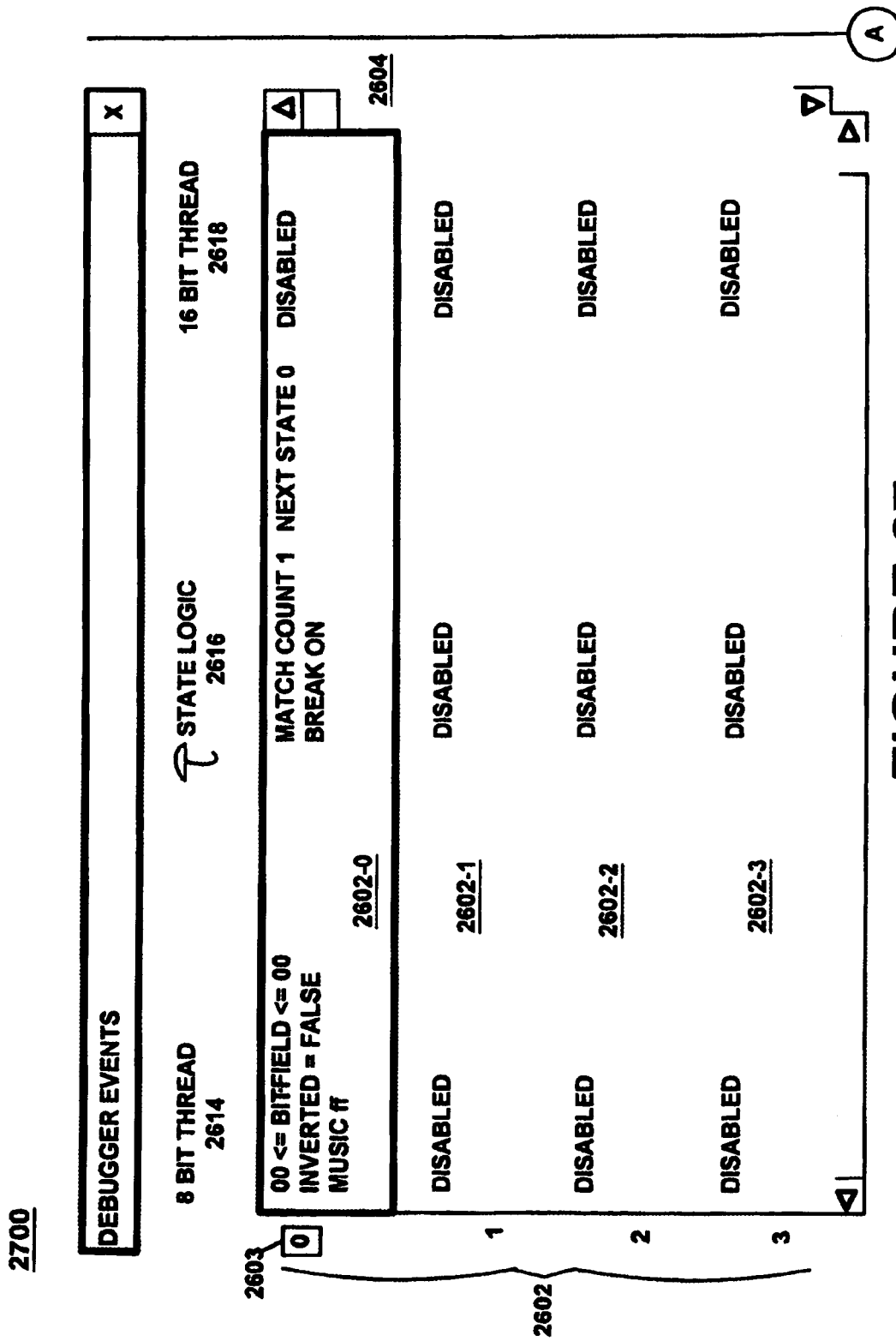
FIG. 27 is a screen shot of an exemplary GUI window arrangement, depicting the programming of a single thread of a single state of a single program, in accordance with an embodiment of the present invention.
Figure 27:
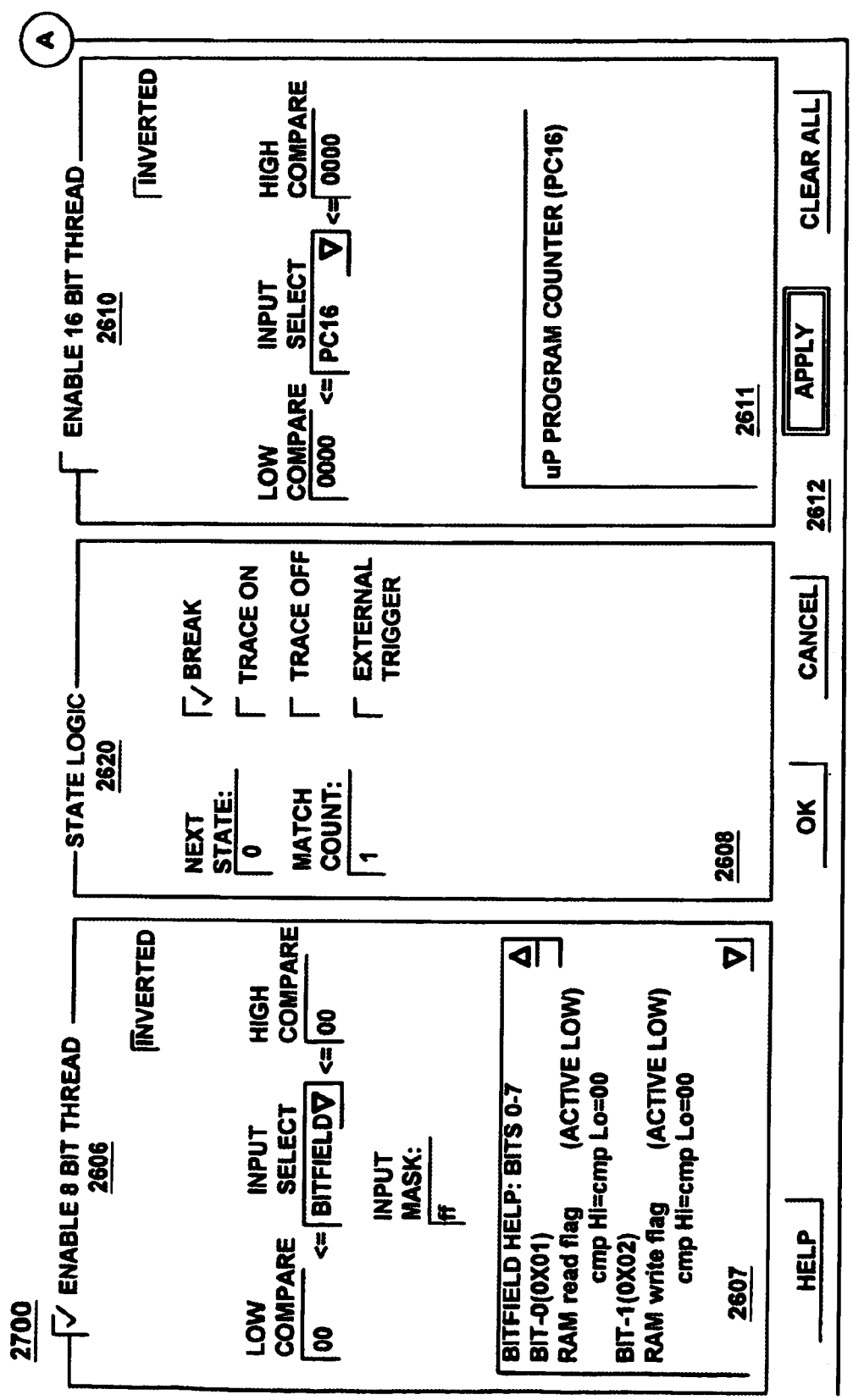

Referring now to FIG. 27, a screen shot of a window 2700 is depicted. Window 2700 displays a condition in which a single state with a single thread has been selected and enabled by GUI 2448. Parameters set constitute the default settings of one embodiment. State logic field window 2608 shows that the selector 2620 for 'Break' is activated, as displayed by the check mark in the corresponding 'Break' box. This indicates that the break set is engaged as also indicated in state 2602-0. 'Break' and 'External Trigger' selectors are not mutually exclusive, e.g., they may be selected at the same time. Further, neither "break' nor 'External Trigger' is exclusive of either of the 'Trace' selectors being selected with them. However, 'Trace On' and 'Trace Off' may not be selected simultaneously. State logic field 2620 shows that the match count is '1' and that the next state selected is '0' in the corresponding text boxes.

Field window 2606 shows by the check mark that an 8-bit thread is enabled, as also shown in state 2602-0. The input selected is a bitfield of '0'. The present exemplary event selected by GUI 2448 will program the event engine 120 (e.g., FIGS. 1, 3, 21, 25) to loop and then 'Break', since the 'Break' is enabled, and the specified condition '0' is reached. Field window 2606, in the present example, displays a setup to check for a Bitfield of zero (0), wherein 'High Compare' and 'Low Compare' are both set to '0', and the bit value selected is '0'. This is the defined thread condition for the highlighted state 2602-0. Text box help subfield 2707 displays useful information to users of GUI 2448.

For example, in the current state selection, if a user changed the input select from 'Bitfield' to 'IODA' (e.g., Input/Output Data Address), text would be promulgated by GUI 2448 to display information to the user to the effect that 'this is the address for an I/O Operation'. It thus explains to users their options for any 'input selection' they make. Another example appears in field window 2610, wherein a similar text box 2611 explains that the corresponding 16-bit input selection 'PC16' means 'microprocessor (e.g., μP) Program Counter 16'.

'State Logic' window field 2608 displays to users and provides to them effective controls that determine how GUI 2448 unifies the state, e.g., the threads that are enabled. The 'next state' box of field 2608 displays and sets where GUI 2448 proceeds upon satisfaction of currently set conditions, provided another state is to be entered. The 'Match Count' box of field window 2608 displays and sets how many times the set conditions are to be satisfied before triggering the events selected by event selector boxes 2620. Unifying characteristics are thus displayed and set in field 2608 by GUI 2448.

Window 2602 functions to graphically summarize the GUI 2448 unificator situational status and the states of the 8-bit and 16-bit threads. Window 2602 functions to allow users, when working on one particular thread to see the settings of all the other ones. However, in one embodiment, only the settings of the highlighted event subfield, in the present example only subfield 2602-0, are accessible for setting at any particular time via windows 2606 and 2610.

Referring now to FIG. 28, a screen shot of a window 2800 is depicted. Window 2800 displays a condition in which a single state having two threads has been selected and enabled by GUI 2448. In the present example, both an 8-bit and a 16-bit thread are enabled and programmed. This is shown by the check marks in the Enable 8-bit Thread and the Enable 16-bit Thread boxes at the top of field windows 2606 and 2610, respectively. It is also shown by information appearing in highlighted subfield 2602-0 regarding both 8-bit and 16-bit threads.

With both the 8-bit and the 16-bit threads enabled, GUI 2448 opens a Combinatorial Operator window 2840 within State Logic field window 2608. Through window 2840, unifying functions may be selected by a user scrolling through a set of selectors for various combinatorial logic operations and clicking to highlight an icon and/or a text label. The icon and/or text label clicked will be the appropriate one for the operation the user wishes to implement.

Combinational Operator 2840 allows the user to select the function of combinational logic (e.g., combinational logic 1110; FIG. 11A) to determine when the events are triggered, based on the conditions of the two threads. This basically links the threads together into a single thread expression for the state. In the present example illustrated by window screen shot 2800, a user has both 8-bit and 16-bit threads enabled. Both threads have conditions that could trigger indicting that they have been satisfied. GUI 2448 then executes the specified event according to the logical operation selected by Combinatorial Operator 2840. In other words, both threads must be satisfied before the thread expression is satisfied due to the "AND" logic selected.

In the present example illustrated by screen shot 2800, the specified event is a 'break'. This is evident because there is a check mark in the box for the 'break' event among the event selector boxes 2608. Since the 'AND' logical function is selected, upon both the 8-bit thread condition and the 16-bit tread condition being satisfied at the same time, the selected 'break' event will occur. The user could select any unifying logic operation from window 2840, such as NAND, OR, NOR, etc., by scrolling window 2840 and selecting the logic.

With reference now to FIG. 29, a screen shot of a window 2900 is depicted. Window 2900 displays a condition in which GUI 2448 has moved to a different state beyond the initial state where multiple states are defined and states have multiple threads defined for each. The combination of these complex states provide a robust debug program that will be programmed into the event engine of the FPGA of the ICE unit (e.g., event engine 120; FIG. 1, 3, 21, 25 and FPGA 2130, ICE 2110; FIGS. 21, 25). The currently selected state is indicated by subfield 2602-2 for state 2 (e.g., the third state), being highlighted. State 2 has both the 8-bit and the 16-bit threads selected and the 'NOR' combinational logic operation selected. The next state selected for state 2 is state 1, and the match count selected is 1. Thus, once the conditions selected for the 8-bit and for the 16-bit threads are satisfied, the are combined by GUI 2448 in a 'NOR' operation.

When the 'NOR' outcome is true, then this next state will be triggered. In the present example, neither 'Break', 'Trace', nor "External Trigger' events are enabled. Thus, upon being unified by the 'NOR' operator, GUI 2448 will move back up into state '1'. The next state selected for state '1', as shown in subfield 2602-1, is state '0'. Upon satisfying the event selected for state '1', GUI 2448 has reached the top of window 2602, e.g., is back to subfield 2602-0 for state '0'. The next state selected for state '0' is state '2', thus GUI 2448 moves back to state 2 upon satisfying the conditions specified for state '0'.

Thus, GUI 2448 checks for sequences of conditions. GUI 2448 waits until the criteria for state '2' are met. It then checks for meeting the conditions of state '1'. When the criteria of state '1' are met, GUI 2448 checks for the satisfaction of the conditions for state '0'. In the present example, a 'Break' is set upon satisfying the conditions of state '0'. This is seen in subfield 2602-0, under the state logic header 2616, where GUI 2448 displays the text 'Break On'. Thus, upon satisfying the condition specified for state '0', execution halts upon executing the 'Break' function selected. GUI 2448, at that point, waits for state '2'again. GU 12448 thus waits for things to happen in a certain order, which may be selected by a user, before taking an action. In the present embodiment, GUI 2448 sets up a sequence of things to check for.

Figure 30:
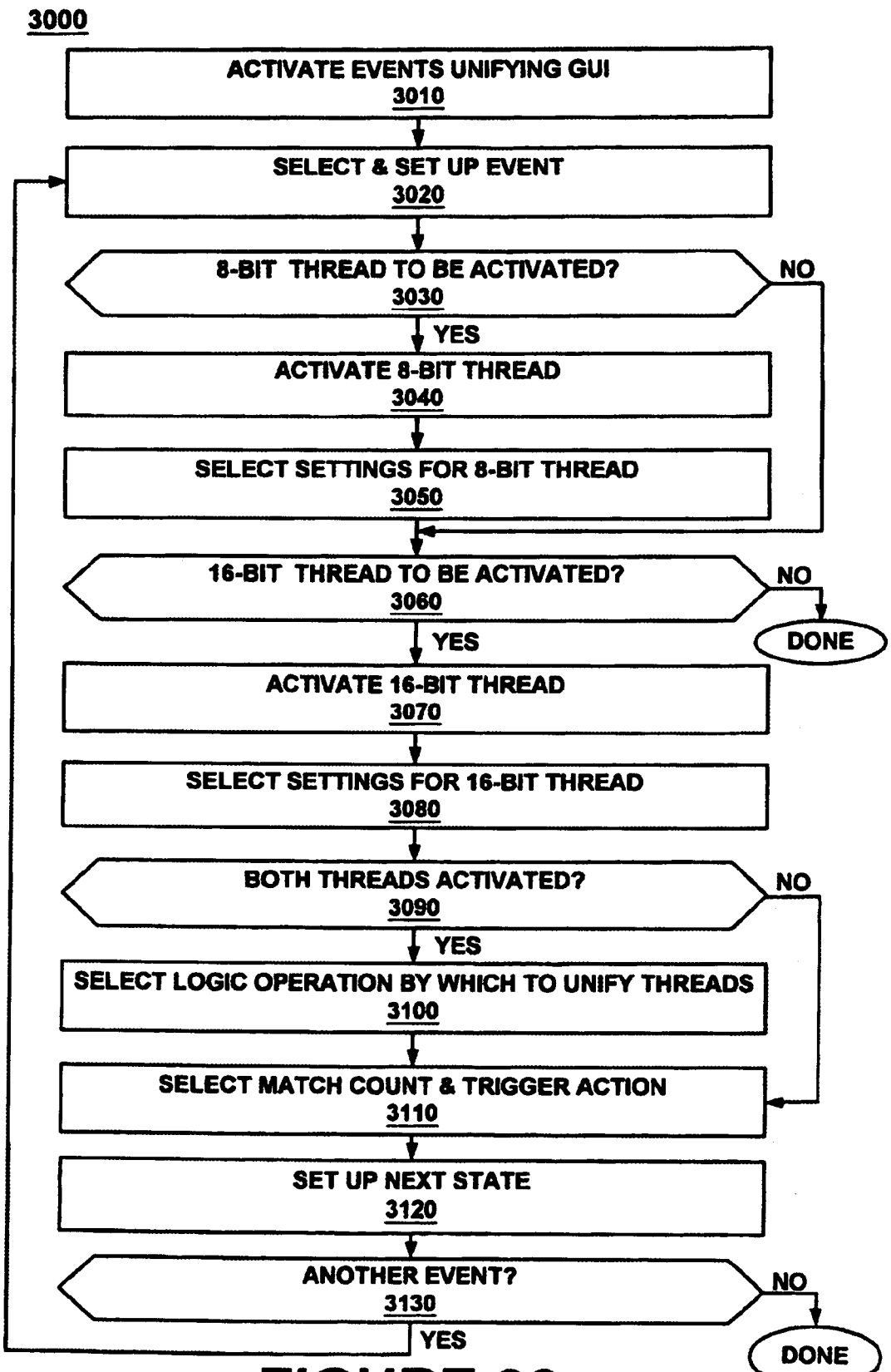
FIG. 30 is a flowchart of a process for programming using a GUI, in accordance with an embodiment of the present invention.

With reference to FIG. 30, a flowchart describes a unification process 3000 implemented by a GUI for debugging events and/or a logic analyzer. Process 3000 begins with step 3010, wherein an events unifying GUI (e.g., GUI 2448; FIG. 24, 25) is activated by a user seeking to debug code and/or monitor and analyze a sequence of events.

Using the events unifying GUI, in step 3020, a first event in a series of events is set up, beginning with selection of an initial state, such as by highlighting an appropriate event field (e.g., subfield 2602-0; FIGS. 26, 27).

In step 3030, it is determined whether a first particular thread is to be activated. If so, in step 3040, that first particular thread is enabled, (such as by clicking a box, e.g., 8-bit thread selection box, field 2606; FIG. 27). Upon enabling a first particular thread, then in step 3050, the settings for that thread are selected (such as by similar user GUI actions).

Upon selecting the settings for the first particular thread, or if it was determined in step 3030 that the first particular thread was not to be enabled, then in step 3060, it is determined whether a subsequent particular thread is to be activated. If not, process 3000 may be complete at this point.

However, if it is determined that a subsequent particular thread is to be activated, then in step 3070, that subsequent particular thread is enabled (such as by clicking a box, e.g., 16-bit thread selection box, field 2610; FIG. 28). Upon enabling the subsequent particular thread, then in step 3080, the settings for that thread are selected (such as by similar user GUI actions).

In the present embodiment, process 3000 determines whether either or both of a first (e.g., 8-bit) thread and a second (e.g., 16-bit) thread are to be activated. In another embodiment, further subsequent numbers of threads may also be selected for activation.

In step 3090 of the present embodiment, it is determined whether both threads are enabled (in another embodiment, it may be determined whether further subsequent numbers of threads may also be selected for activation). If not, process 3000 continues to step 3110, below.

If it is determined that both (e.g., or all) threads are enabled, then in step 3100, a logical operation is selected. The logical operation serves to unify (e.g., tie together) the threads by combinational logic (e.g., combinational logic 1110; FIG. 11A).

The GUI allows a user to select the logical operation to unify threads in a particular state, such as by a combinational logic selector (e.g., combinational logic selector 2840; FIGS. 28, 29).

In step 3110, a match count (e.g., the number of times the selected event must occur) is selected, as well as any particular action (e.g., 'Break', 'Trace On'/Off' to be triggered. In step 3120, a next state is selected.

These selections, in one embodiment, may involve user actions with checking boxes and/or filling in text boxes (e.g., trigger selector boxes 2620, etc. in state logic field 2608; FIGS. 26, 27, 28, 29). In another embodiment, pop-up windows, drop-down menus, and other such GUI mechanisms may be deployed to control these and similar actions, activities, and selections.

It is determined in step 3130 whether additional events are to be set up. If not, in step 3140, the single event set up (e.g., through step 3120) is set on and process 3000 is complete at that point.

If however it is determined that additional events are to be set up, then process 3000 loops back to step 3020 and repeats.

Figure 31:
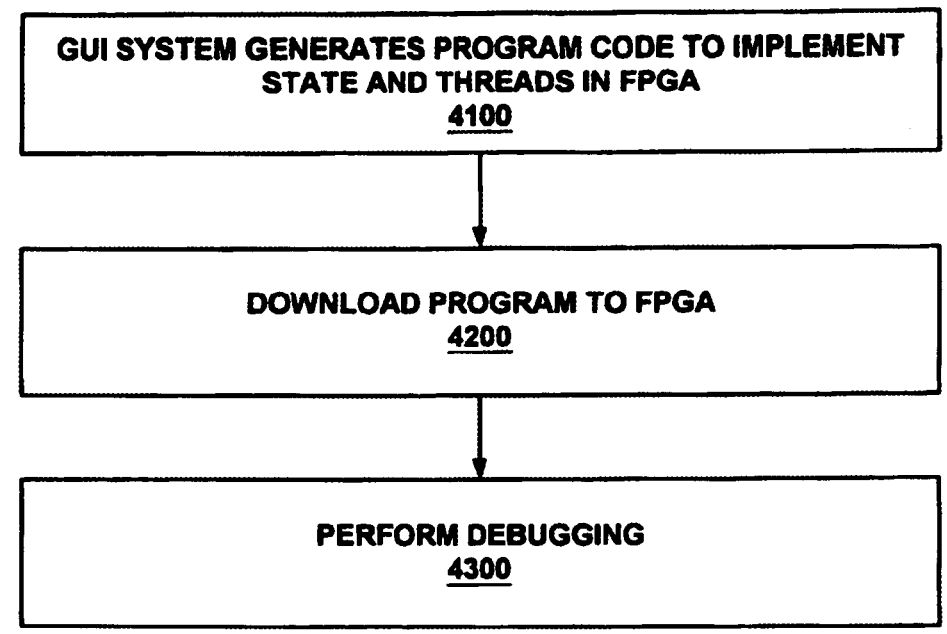
FIG. 31 is a flowchart of the steps in a process for debugging using a GUI, in accordance with an embodiment of the present invention.

With reference to FIG. 31, the steps in a process 4000 for debugging using a GUI (e.g., GUI 2448; FIGS. 24, 25), in accordance with an embodiment of the present invention. Process 4000 begins with step 4100, wherein a GUI system generates program code to implement states and threads into an FPGA (e.g., FPGA 2130; FIGS. 21, 25). In step 4200, the program image is downloaded to the FPGA. In step 4300, the system performs debugging accordingly.

In summary, a logic unifying tool applicable to debugging systems, logic analyzers, scopes, and the like is achieved in one embodiment by a graphical user interface (GUI). It can combine external inputs with internally generated events. In one embodiment, an interface for programming a thread constituting, for example, an event engine and a graphical user interface (GUI) or other programming functionality for causing the event engine to monitor a signal and execute an action based on the signal. The GUI causes the event engine to be programmed via a configuring RAM in one embodiment. Further, the interface programs and event and several states of the thread and causes the thread to traverse between the states upon reaching the event. In one embodiment, the further programs a logic chain which combines (e.g., unifies) the threads In one embodiment, a method for unifying several threads is effectuated, for example, by selecting several threads, selecting a setting for each thread, selecting a logic operation by which to unify the threads and executing the logic operation. In one embodiment, one thread is an 8-bit thread and the other is a 16-bit thread. The logic operation may be selected to be AND, OR, NOR, NOT, and NAND in one embodiment. In one embodiment, the method may further configure several states and cause traversing between states. Upon traversing to each state, the process is repeated.

Advantageously, embodiments of the present invention may be deployed co-functionally with debuggers, logic analyzers, scopes, utilities, and software development tools.

An embodiment of the present invention, a graphical user interface (GUI) with logic unifying functions, is thus described. While the present invention has been described in particular embodiments, it should be appreciated that the present invention should not be construed as limited by such embodiments, but rather construed according to the below claims and their equivalents.

What is claimed is:

1. A computer controlled programming tool having a graphical user interface and comprising:
 a first window for displaying a plurality of selectable state informations, each state information comprising first thread information, second thread information and state logic information;
 a second window for defining a first thread associated with a selected state information;
 a third window for defining a second thread associated with said selected state information;
 a fourth window for defining an action associated with said selected state information and for defining a union of said first and said second thread of said selected state information; and
 a code generator for generating program code, based on said state informations, for programming a programmable circuit.

2. A computer controlled programming tool as described in claim 1 wherein said union is a Boolean expression.

3. A computer controlled programming tool as described in claim 2 wherein said fourth window comprises a scrollable listing of a plurality of Boolean expressions from which said union is selected.

4. A computer controlled programming tool as described in claim 1 wherein said fourth window comprises a field for selecting a next state information to define said action of said selected state information.

5. A computer controlled programming tool as described in claim 1 wherein said first thread is an 8-bit thread and said second thread is a 16-bit thread.

6. A computer controlled programming tool as described in claim 1 wherein said programmable circuit is an event engine of a field programmable gate array.

7. A computer controlled programming tool as described in claim 1 wherein said first window is scrollable to display said plurality of selectable state informations and wherein said selected state information is visually differentiated.

8. A computer controlled programming tool as described in claim 1 wherein said first thread information of each state information is updated to reflect any selections made in said second window.

9. A computer controlled programming tool as described in claim 8 wherein said second thread information of each state information is updated to reflect any selections made in said third window.

10. A computer controlled programming tool as described in claim 9 wherein said state logic information of each state information is updated to reflect any selections made in said fourth window.

11. A computer controlled programming tool as described in claim 1 wherein said second window comprises a signal name selection and a value range selection.

12. A computer controlled programming tool as described in claim 11 wherein said third window comprises a signal name selection and a value range selection.

13. A method for unifying a plurality of threads of a debug thread engine comprising:
 a) selecting a thread from a plurality of threads of a graphical user interface;
 b) selecting another thread from said plurality of threads;
 c) selecting a logic operation by which to unify said thread and said another thread;
 d) automatically generating program code based on said a), b), and c);
 e) programming said debug event engine with said program code; and
 f) performing debug operations using said debug event engine and a device under test.

14. The method as recited in claim 13 further comprising:
 g) selecting a setting for said thread and for said another thread wherein said g) is performed before said d).

15. The method as recited in claim 13 wherein c) comprises selecting said logical operation from a scrollable listing of a plurality of predetermined operations of said graphical user interface.

16. The method as recited in claim 13 wherein said plurality of threads comprises 8-bit threads and 16-bit threads.

17. The method as recited in claim 13 wherein said logic operation is selected from the group consisting essentially of AND, OR, NOR, NOT, and NAND.

18. The method as recited in claim 13 wherein said thread and said another thread are included within a first state.

19. The method as recited in claim 18 further comprising repeating said a)–c) for a second state.

20. The method as recited in claim 19 wherein f) comprises traversing between said first state and said second state.

21. A system comprising a programmable event engine and a tool for programming said event engine wherein said tool executes a method for unifying a plurality of threads, said method comprising:
 a) selecting a thread from a plurality of threads of a graphical user interface;
 b) selecting another thread from said plurality of threads;
 c) selecting a logic operation by which to unify said thread and said another thread;
 d) automatically generating program code based on said a), b), and c);
 e) programming said debug event engine with said program code; and
 f) performing debug operations using said debug event engine and a device under test.

22. The system as recited in claim 21 wherein said method further comprises:
 g) selecting a setting for said thread and for said another thread wherein said g) is performed before said d).

23. The system as recited in claim 21 wherein c) comprises selecting said logical operation from a scrollable listing of a plurality of predetermined operations of said graphical user interface.

24. The system as recited in claim 21 wherein said plurality of threads comprises 8-bit threads and 16-bit threads.

25. The system as recited in claim 21 wherein said logic operation is selected from the group consisting essentially of AND, OR, NOR, NOT, and NAND.

26. The system as recited in claim 21 wherein said thread and said another thread are included within a first state.

27. The system as recited in claim 26 further comprising repeating said a)–c) for a second state.

28. The system as recited in claim 27 wherein f) comprises traversing between said first state and said second state.

29. A computer controlled programming tool comprising:

a graphical user interface comprising a plurality of windows for displaying a plurality of selectable state informations and for programming threads and state logic associated with a selected one of said selectable state informations wherein each state information comprises a first thread for defining a first detectable event, a second thread for defining a second detectable event and a state logic for providing an associated action to be taken and wherein said state logic comprises a union for combining said first and second threads; and a code generator for automatically generating program code, based on said state informations, for programming an event engine of said programmable circuit.

30. A computer controlled programming tool as described in claim 29 wherein said event engine is used to detect and signal the occurrence of internal events of a device under test for debugging purposes.

31. A computer controlled programming tool as described in claim 30 wherein said device under test is coupled to said programmable circuit.

* * * * *